United States Patent [19]
Jitsukata et al.

[11] Patent Number: 5,162,897
[45] Date of Patent: Nov. 10, 1992

[54] PROJECTION TYPE STEREOSCOPIC IMAGE DISPLAY SYSTEM

[75] Inventors: Hiroshi Jitsukata, Yokohama; Kyohei Fukuda, Fujisawa; Nobuhiro Konuma, Yokohama; Masaki Yoshii, Yokohama; Yasuo Amano, Yokohama, all of Japan

[73] Assignee: Hitachi, Ltd., Tokyo, Japan

[21] Appl. No.: 561,293

[22] Filed: Jul. 31, 1990

[30] Foreign Application Priority Data

Aug. 2, 1989 [JP] Japan .................................. 1-199312
Aug. 16, 1989 [JP] Japan .................................. 1-210191
Sep. 1, 1989 [JP] Japan .................................. 1-224385
Oct. 20, 1989 [JP] Japan .................................. 1-271450

[51] Int. Cl.⁵ ...................... H04N 15/00; H04N 13/04
[52] U.S. Cl. .......................................... 358/3; 358/60; 358/88; 358/237

[58] Field of Search ................ 358/88, 3, 60, 61, 62, 358/63, 231, 232, 233, 234, 235, 236, 237, 238, 239

[56] References Cited

U.S. PATENT DOCUMENTS 4,737,840  4/1988  Morishita ........................ 358/88
4,872,750  10/1989  Morishita ........................ 358/88
4,905,076  2/1990  Annegarn ........................ 358/3

Primary Examiner—Howard W. Britton
Attorney, Agent, or Firm—Antonelli, Terry Stout & Kraus

[57] ABSTRACT

A projection-type stereoscopic image display system is disclosed in which a left-eye projection light ray and a right-eye projection light ray are projected from behind a transparent screen thereby to display a stereoscopic image.

38 Claims, 33 Drawing Sheets

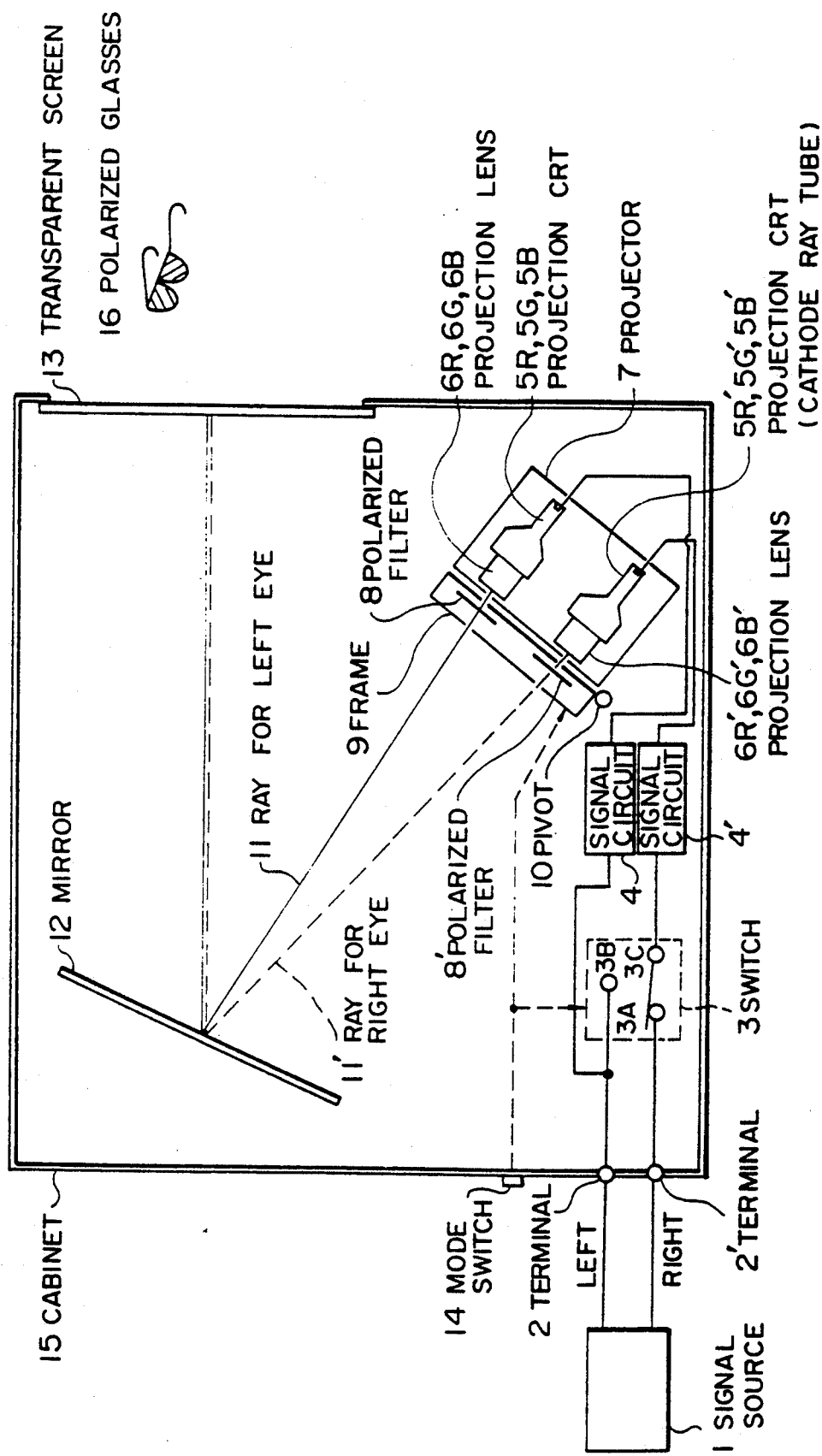

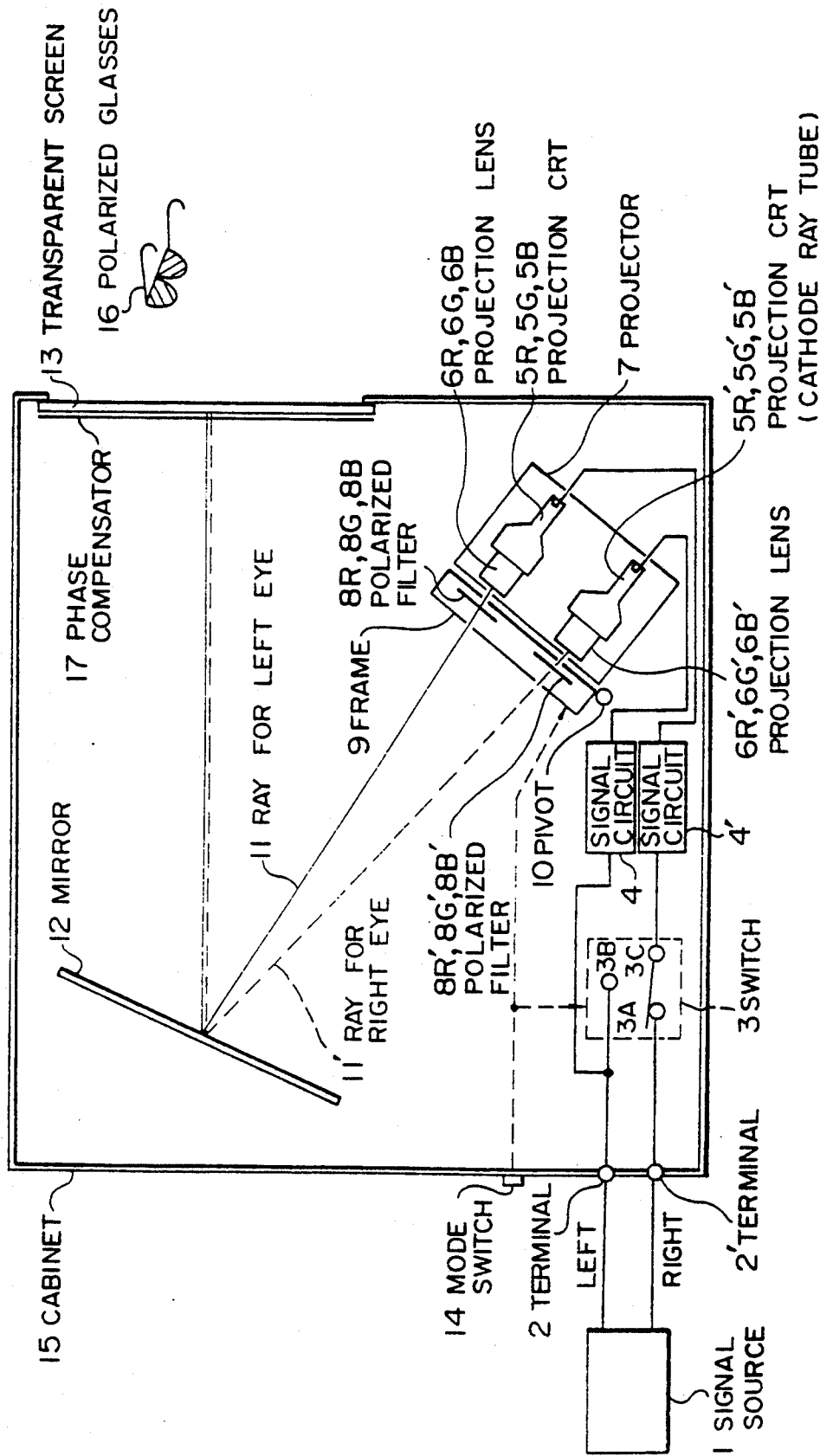

14 TRANSPARENT SCREEN

33 TRANSPARENT SCREEN

FIG. 24

| VIDEO LIGHT SOURCE | | SCREEN | | |
|---|---|---|---|---|
| LIGHT SOURCE | (a) | (b) FRESNEL SHEET | (c) | (d) LENTICULAR SHEET |
| I-1 — LEFT 21 / RIGHT 22 | | 5 | | 4 |
| I-2 | | 5 | 6 | 4 |
| I-3 | 7 / 7 | 5 | | 4 |

FIG. 25

| | INCIDENT LIGHT | OUTGOING LIGHT | LIGHT PHASE DIFFERENCE | DIRECTION OF OPTICAL AXIS |
|---|---|---|---|---|
| 1 | CLOCKWISE/COUNTER-CLOCKWISE POLARIZATION | SAME AS LEFT | $N\pi + \Delta\delta$ | FREE |
| 2 | PERPENDICULARLY CROSSED LINEAR POLARIZATION | SAME AS LEFT | | |
| 3 | CLOCKWISE/COUNTER-CLOCKWISE POLARIZATION | PERPENDICULARLY CROSSED LINEAR POLARIZATION | $N\pi + \dfrac{\pi}{2} + \Delta\delta$ | $\dfrac{\pi}{4}$ |
| 4 | PERPENDICULARLY CROSSED LINEAR POLARIZATION | CLOCKWISE/COUNTER-CLOCKWISE POLARIZATION | | |

$N = 0, \pm 1, \pm 2, \cdots$
$\Delta\delta < 0.2\pi$ (RADIAN) FOR CONTRAST OF 10 OR MORE

FIG. 27

| TYPE | SYMBOL | MATERIAL AND PROCESS | n12 | n13 (×10⁻⁶) | n23 | LIGHT PHASE DIFFERENCE (MAX RADIANS) |
|---|---|---|---|---|---|---|
| FRESNEL LENS 3 mm | F1 | ACRYLIC RESIN EXTRUSION ROLL MOLDING | 8 (0.008π)* | 5 (0.01π)** | 3 | 0.09π |
| | F2 | ACRYL/STYRENE COPOLYMER EXTRUSION ROLL MOLDING | 100 (π)* | 50 (0.12π)** | 50 | 1.12π |
| | F3 | DITTO (PROCESSING CONDITIONS CHANGED) | 50 (0.5π)* | 25 (0.06π)** | 25 | 0.56π |
| | F4 | ACRLIC RESIN CAST PLATE | ≃0 | 20 | 20 | 0.05π |
| LENTICULAR LENS 1.4 mm | L1 | ACRLIC RESIN EXTRUSION ROLL MOLDING | 15 | 5 | 10 | 0.07π |
| | L2 | ACRYL/STYRENE COPOLYMER EXTRUSION ROLL MOLDING | 300 | 50 | 350 | 1.43π |

NOTE: * LIGHT PHASE DIFFERENCE (IN RADIANS) DUE TO IN-PHASE DOUBLE REFRACTION

** LIGHT PHASE DIFFERENCE (IN RADIANS) DUE TO DOUBLE REFRACTION ALONG THICKNESS IN THE SECTION

FIG. 28

| CORRESPONDENCE WITH FIG. 2 | OPTICAL SYSTEM | TOTAL PHASE DIFFERENCE (RADIAN) | Δδ (RADIAN) | CONTRAST RATIO | N |
|---|---|---|---|---|---|
| COLUMNS 1 AND 2 $\left(\begin{array}{c}\text{LIGHT PHASE}\\\text{DIFFERENCE}\\\delta = N\pi + \Delta\delta\end{array}\right)$ | F1 - L1 | 0.16π | 0.16π | 15 OR MORE | 0 |
| | F4 - L1 | 0.12π | 0.12π | 27 OR MORE | 0 |
| | F2 - L1 | 1.19π | 0.19π | 10 OR MORE | 1 |
| | F3 - L2 | 1.99π | 0.01π | 100 OR MORE | 2 |
| COLUMNS 3 AND 4 $\left(\delta = N\pi + \frac{\pi}{2} + \Delta\delta\right)$ | F3 - L1 | 0.63π | 0.13π | 22 OR MORE | 0 |
| | F1 - L2 | 1.52π | 0.02π | 100 OR MORE | 1 |
| | F4 - L2 | 1.48π | 0.02π | 100 OR MORE | 1 |
| | F2 - L2 | 2.55π | 0.05π | 100 OR MORE | 2 |

FIG. 29

| CORRESPONDENCE WITH FIG. 2 | | FRESNEL LENS | | LENTIC-ULAR LENS | | PHASE COMPEN-SATOR 6 | PHASE COMPEN-SATOR 7 | Δδ (RADIANS) | CONTRAST |
|---|---|---|---|---|---|---|---|---|---|
| 1 | CHANGE COLUMNS 1,2 TO COLUMNS 3,4 | F3 | 0.56π | L2 | 1.43π | ⊖1.43π | — | 0.06π | 100 OR MORE |
| | | F1 | 0.08π | | | — | ⊖1.5π | 0.01π | 100 OR MORE |
| 2 | CHANGE COLUMNS 3,4 TO COLUMNS 1,2 | F1 | 0.08π | L2 | 1.43π | ⊖1.43π | — | 0.08π | 50 OR MORE |
| | | | | | | — | ⊖1.5π | 0.01π | 100 OR MORE |
| | | F2 | 1.12π | L2 | 1.43π | ⊖1.43π | — | 0.12π | 22 OR MORE |
| | | | | | | — | ⊖1.5π | 0.05π | 100 OR MORE |

FIG. 34

| | VIDEO LIGHT POLARIZATION AT LIGHT SOURCE | LIGHT PHASE DIFFERENCE OF OPTICAL SYSTEM TO SCREEN 80 | POLARIZATION OF RAY LEAVING SCREEN | POLARIZED GLASS |
|---|---|---|---|---|
| A | CIRCULAR POLARIZATION | $N\pi$ | CIRCULAR POLARIZED | CIRCULAR POLARIZED GLASSES |
| B | (CLOCKWISE / COUNTER-CLOCKWISE POLARIZATION) | $N\pi \pm \dfrac{\pi}{2}$ | LINEAR POLARIZED | LINEAR POLARIZED GLASSES |
| C | LINEAR POLARIZATION | $N\pi$ | LINEAR POLARIZED | LINEAR POLARIZED GLASSES |
| D | (HORIZONTAL / VERTICAL POLARIZATION) | $N\pi \pm \dfrac{\pi}{2}$ | CIRCULAR POLARIZED | CIRCULAR POLARIZED GLASSES |
| E | | PHASE DIFFERENCE: AS DESIRED (DIRECTION OF OPTICAL AXIS Φo: UNIFORM) | LINEAR POLARIZED | LINEAR POLARIZED GLASSES |

$N = 0, \pm 1, \pm 2 \cdots$

FIG. 37

| SYMBOL IN TABLE 1 | ERROR $\Delta\delta$ OF LIGHT PHASE DIFFERENCE AND ERROR $\phi$ OF DIRECTION OF OPTICAL AXIS OF OPTICAL SYSTEM TO SCREEN ||
|---|---|---|
| | $\Delta\delta$ | $\phi$ |
| A | $\leq 0.2\pi$ | — |
| B | $\leq 0.2\pi$ | — |
| C | $\leq 0.2\pi$ | — |
| D | $\leq 0.2\pi$ | — |
| E | — | $\leq 0.05\pi$ |

PROJECTION TYPE STEREOSCOPIC IMAGE DISPLAY SYSTEM

BACKGROUND OF THE INVENTION

The present invention relates to a projection-type stereoscopic image display system in which two types of differently polarized light rays are projected so that images for the left and right eyes are displayed respectively on the screen thereby to reproduce a stereoscopic image having a sense of depth.

The present invention also relates to a phase compensator used with the projection-type stereoscopic image display system and a method of fabricating the same.

The present invention further relates to a stereoscopic image display system.

In a conventional system for reproducing a stereoscopic image with a sense of depth from a left-eye image signal and a right-eye image signal, as disclosed in JP-A(U)-63-56889, a left-eye image and a right-eye image differently polarized are projected on an opaque screen, and the projection light reflected from the screen is viewed through glasses.

JP-A-62-285595 discloses another type of system in which a left-eye image and a right-eye image are alternately displayed on the display screen by use of a time-division shutter and a stereoscopic image is reproduced through a pair of polarized glasses in such a manner that the left-eye image enters only the left eye and the right-eye image only the right eye.

SUMMARY OF THE INVENTION

The above-mentioned conventional system for reproducing a stereoscopic image by projecting a left-eye image and a right-eye image on an opaque screen poses the problem that a stereoscopic image of high contrast is impossible to reproduce as the system is easily affected by external light. Also, it has a disadvantage in that a sufficient screen brightness is hard to obtain in reproducing a non-stereoscopic image.

The present invention has been developed in view of the above-mentioned problems of the prior art, and an object thereof is to provide a projection-type stereoscopic image display system which is capable of reproducing a stereoscopic image of high contrast without being affected by the external light.

Another object of the present invention is to provide a projection-type stereoscopic image display system which is capable of securing a sufficient screen brightness even in reproducing a non-stereoscopic image.

In order to achieve the former object, according to the present invention, there is provided a projection-type stereoscopic image display system comprising a transparent screen in which the left-eye projection light ray and the right-eye projection light ray are projected from behind the transparent screen and a stereoscopic image is thus reproduced by displaying the left-eye and right-eye images.

In order to achieve the latter object, on the other hand, there is provided a projection-type stereoscopic image display system in which in the process of reproducing a non-stereoscopic image, the same image signal, instead of a left-eye image signal and a right-eye image signal, is transmitted to a left-eye signal circuit and a right-eye signal circuit at the same time with a left-eye polarizing filter or polarizer removed from the front of the left-eye projection optical system and a right-eye polarizing filter or polarizer from the front of the right-eye projection optical system respectively.

According to one aspect of the present invention, projecting the left-eye projection light and the right-eye projection light from behind the transparent screen to display a left-eye image and a right-eye image respectively permits the reproduction of a stereoscopic image of high contrast.

If a plastics screen is used as a transparent screen and a linearly polarized light is projected on the transparent screen, however, the double refraction due to the residual mechanical stress distortion caused in the process of screen forming splits the linearly polarized light into two polarization components. Since these components pass through the transparent screen at different velocities, the phase of one polarization component lags behind that of the other and a relative phase difference (retardance) occurs between them upon leaving the screen. A combination of these two components thus forms an elliptically polarized light. When the left-eye projection light and the right-eye projection light passed through the transparent screen are viewed with polarized glasses, therefore, a part of the left-eye projection light enters the right eye, and a part of the right-eye projection light the left eye. The resultant insufficient separation of the left- and right-eye images makes impossible the reproduction of a stereoscopic image based on the parallax between the eyes, thereby leading to the problem of what is called the ghost or double vision.

According to another aspect of the present invention, the aforementioned problem is obviated by a plastics screen with small double refraction which is produced by an optimized molding process, molding conditions and post-molding process, and is used as the transparent screen.

According to still another aspect of the present invention, even when a plastics screen with double refraction is used as a transparent screen, the above-mentioned problem is solved by arranging a phase compensator of a transparent plastics film in the paths of the left- and right-eye projection light rays leading from the left- and right-eye polarizing filters respectively to the transparent screen.

Specifically, the phase compensator has a retardance of substantially the same absolute value as but with the opposite sign to the transparent screen. Upon the entrance of a linearly polarized light ray into the phase compensator, therefore, the double refraction thereof causes the light ray to leave as an elliptically polarized ray. This elliptically polarized ray entering the transparent screen leaves the same again as a linearly polarized ray due to the double refraction thereof. The double refraction of the transparent screen is thus compensated for by the phase compensator.

According to a further aspect of the invention, in reproducing a non-stereoscopic image, the signal circuits for left and right eyes are respectively supplied with the same image signal in place of the image signals for the left and right eyes, whereby the projection light ray from the left-eye projection optical system comes to have the same image contents as that from the right-eye projection optical system. As a result, the brightness on the screen is the sum of the brightnesses due to the projection light rays from the left- and right-eye projection optical systems.

According to a still further aspect of the invention, a left-eye polarizing filter with a transmittance of about several ten % is removed from the front of the left-eye projection optical system and the right-eye polarizing filter with a transmittance of about several ten % from the front of the right-eye projection optical system, thereby increasing the screen brightness more than several times.

BRIEF DESCRIPTION OF THE DRAWINGS

FIGS. 1A and 1B are diagrams for explaining a configuration of a projection-type stereoscopic image display system according to an embodiment of the present invention.

FIGS. 4A and 4B are diagrams for explaining a configuration of a projection-type stereoscopic image display system according to still another embodiment of the present invention.

FIG. 24 is a diagram showing a configuration of an optical system according to an embodiment of the present invention.

FIG. 25 is a diagram showing the required light phase differences for various combinations of polarizations.

FIG. 27 is a diagram showing the characteristics of a fresnel lens and a lenticular sheet used for embodiments of the present invention.

FIGS. 28 and 29 are diagrams showing the characteristics of various combinations of fresnel lens and lenticular sheet used for embodiments of the present invention.

FIG. 34 is a diagram showing a light phase difference of an ideal optical system according to the present invention.

FIG. 37 is a diagram showing the relationship between the contrast and the combined error of the light phase difference and the optical axis.

DESCRIPTION OF THE PREFERRED EMBODIMENTS

An embodiment of the present invention will be described below with reference to the accompanying drawings.

Figure 1B:
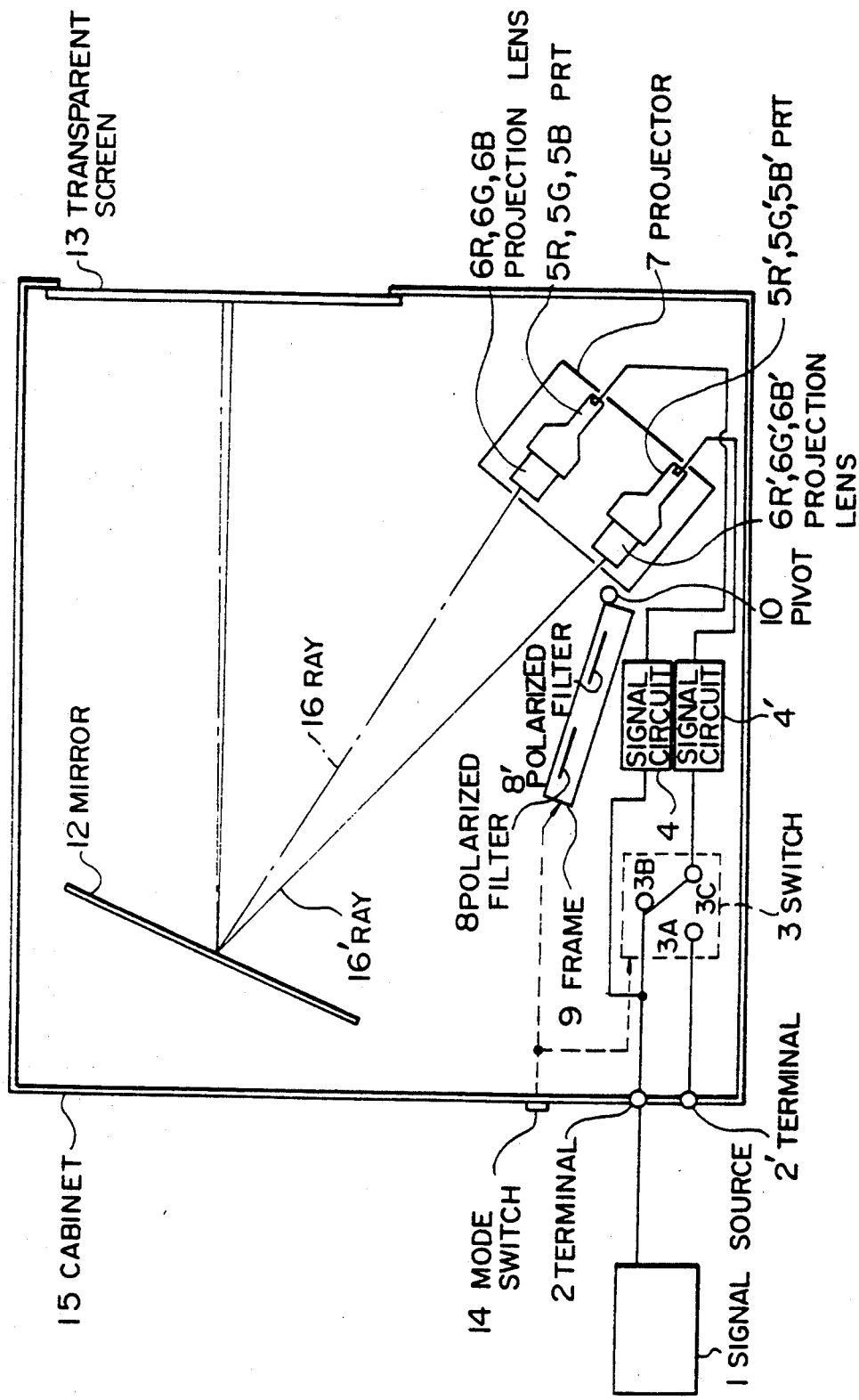
Figure 2A:
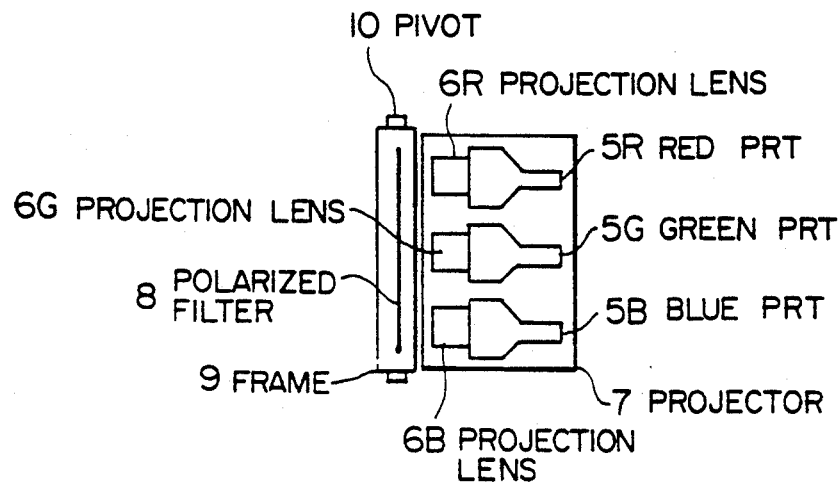
FIGS. 2A and 2B are a plan view and a front view respectively of a projector in FIG. 1.

FIGS. 1A and 1B are diagrams for explaining a configuration of a projection-type stereoscopic image display system according to an embodiment of the present invention, of which FIG. 1A shows the condition of reproducing a stereoscopic image and FIG. 1B that of reproducing a non-stereoscopic image. On the other hand, FIG. 2A is a plan view showing a projector in FIGS. 1A and 1B, and FIG. 2B a front view of the same projector.

First, the operation of reproducing a stereoscopic image in this embodiment will be explained with reference to FIG. 1A.

In FIG. 1A, a signal source 1 designates a stereoscopic video disk player for reproducing an image signal for the left eye (which may hereinafter be referred to as "the left-eye signal") L and an image signal for the right eye (which may hereinafter be referred to as "the right-eye signal") R from an optical disk having recorded therein the left-eye signal L and right-eye signal R as different bit trains in parallel spiral fashion.

The left-eye signal L and the right-eye signal R produced from the signal source 1 are supplied to input terminals 2 and 2' respectively. The left-eye signal L supplied to the input terminal 2 is amplified to a predetermined signal level at a signal circuit 4 and drives the PRTs 5R, 5G, 5B for red (R), green (G) and blue (B) color respectively. The left-eye projection light rays 11 released from the phosphor screen of the PRTs 5R, 5G, 5B are projected on a transparent screen 13 by projection lenses 6R, 6G, 6B respectively thereby to form an enlarged television image on the transparent screen 13.

The right-eye image signal R supplied to the terminal 2', on the other hand, is applied to a signal circuit 4' through contacts 3A, 3C of a switch 3, and after being amplified to a predetermined signal level, is used to drive the PRTs 5R', 5G', 5B' for red, green and blue colors respectively. The right-eye projection rays 11' released from the PRTs 5R', 5G', 5B' are projected on the transparent screen 13 through the projections lenses 6R', 6G', 6B', thus forming an enlarged television image on the transparent screen 13.

Numeral 12 designates a plane mirror for bending the light paths of the projection rays 11, 11' in order to reduce the outer dimensions of the system.

Figure 2B:
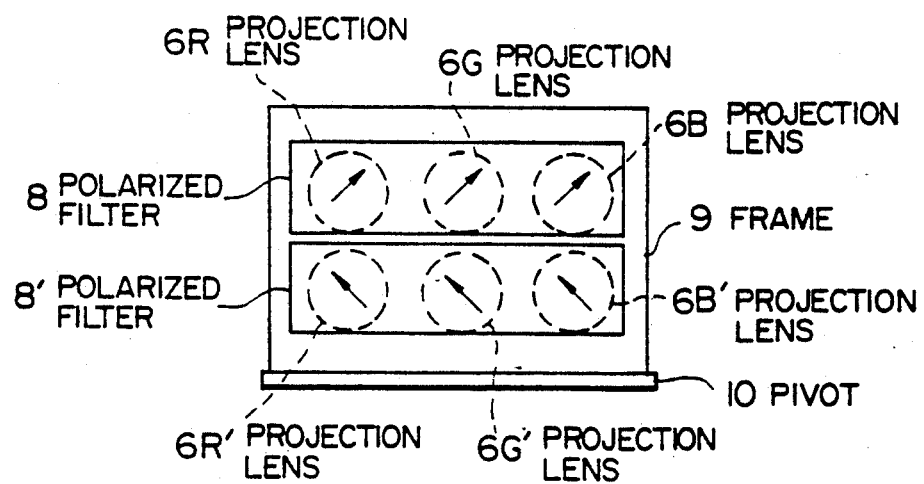

The projector 7 includes the PRTs 5R, 5G, 5B with projection lenses 6R, 6G, 6B arranged on the upper side for the left eye and the PRTs 5R', 5G', 5B' with projection lenses 6R', 6G', 6B' disposed on the lower side for the right eye. As shown in FIGS. 2A, 2B, a polarizing filter 8 is mounted on a support frame 9 on the front of the projection lenses 6R, 6G, 6B and a polarizing filter 8' on the front of the projection lenses 6R', 6G', 6B'. The support frame 9, which is secured on a rotatable pivot 10, is free to revolve around the pivot 10.

The polarizing filter 8 is for polarizing the left-eye projection ray 11 and the polarizing filter 8' for the right-eye projection ray 11', each being made of a linearly polarizing plate.

The polarizing filter 8 has the azimuth of the polarization plane of the linearly polarizing plate set to +45 degree, and that of the polarizing filter 8' to −45 degree so as to allow the two polarization planes thereof to cross at right angle to each other.

The "polarization plane" is defined as a plane associated with the transmittance of the linearly polarized light ray entering a linearly polarizing plate which becomes maximum when the polarization plane of the linearly polarized plate coincides with the plane of electrical oscillation (polarization plane) of the linearly polarized light. The polarization plane of a linearly polarized plate is shown by arrow in FIG. 2B.

As a consequence, the polarization plane of the left-eye projection light ray 11 polarized through the polarizing filter 8 is displaced by 90 degree from the polarization plane of the right-eye projection light ray 11' polarized through the polarizing filter 8'.

The left-eye projection light ray 11 polarized through the polarizing filter 8 and the right-eye projection light ray 11' polarized through the polarizing filter 8' have the light paths thereof bent by the mirror 12 thereby to form left- and right-eye images on the transparent screen 13 supported on the cabinet 15.

The transparent screen 13 has simultaneously and parallely projected thereon left- and right-eye images continuous in time series. These left- and right-eye images are visible independently of each other by use of the polarized glasses 16 having polarizing plates with polarization planes of +45 and −45 degrees in azimuth. More specifically, the left-eye projection light ray 11 passed through the transparent screen 13 is transmitted to reach the left eye without being absorbed by the left-eye polarizing plate since the left-eye polarizing plate of the polarized glasses 16 coincides with the polarization plane. The left-eye projection light ray 11, however, has a polarization plane 90 degree displaced from the right-eye polarizing plate of the polarized glasses 16, and therefore is absorbed and interrupted by the right-eye polarizing plate and thus fails to reach the right eye. On the contrary, the right-eye projection light ray 11' is transmitted through the right-eye polarizing plate without being absorbed and reaches the right eye since the right-eye polarizing plate of the polarized glasses coincides with the polarization plane. Nevertheless, since the right-eye projection ray 11' has a polarization plane displaced by 90 degree from the left-eye polarizing plate of the polarized glasses 16, the particular ray is absorbed and interrupted by the left-eye polarizing plate and thus fails to reach the left eye. As a result, the left-eye image enters the left eye and the right-eye image the right eye, thereby making it possible to reproduce a stereoscopic image with a sense of depth by the parallax between the eyes.

Generally, if the screen is made of plastics, the mechanical stress distortion caused at the time of screen molding would remain unremoved undesirably causing an anisotropy of refractive index (double refraction).

If a screen of plastics having such a double refraction according to the present embodiment is used as the transparent screen 13, the problems mentioned below would be caused.

Specifically, when the linearly polarized left-eye projection light ray 11 and the right-eye projection light ray 11' linearly polarized by the polarizing filters 8, 8' are transmitted through the transparent screen 13, the double refraction makes it impossible for the left-eye projection light ray 11 and the right-eye projection light ray 11' to maintain the polarization plane thereof, but an elliptic polarization would result.

In other words, when a linearly polarized light ray enters the transparent screen 13, the double refraction splits the linearly polarized light into two polarization components, that is, a normal light ray and an abnormal light ray. Due to the difference in velocity in the transparent screen 13, these two light ray components develop a phase difference upon leaving the transparent screen 13, so that a combination thereof forms an elliptic polarization. The ellipticity and the azimuth (in this case, the angle formed by the main axis of the ellipse with the entrance polarization plane) depend on the relative phase difference (retardance) between the normal and abnormal light rays leaving the transparent screen 13, that is, the double refraction of the transparent screen 13.

When the left-eye projection light ray 11 and the right-eye projection light ray 11' that have thus turned into elliptic polarized light rays are viewed through the polarized glasses, a part of the left-eye projection light ray would be seen to enter the right eye and a part of the right-eye projection light ray the left eye, so that it would be impossible to reproduce a stereoscopic image based on the parallax between the two eyes, thereby causing what is called a ghost with a double-vision image.

In order to obviate this inconvenience, the system according to the present embodiment uses a plastics screen having a small double refraction as the transparent screen 13.

More specifically, a screen molded from an ultraviolet ray-setting resin is used. In the case of this screen, a resin of high fluidity is poured into a molding die and the ultraviolet ray is irradiated on the resin to harden it for the purpose of molding. In this way, the mechanical stress of the screen molding is reduced for a smaller double refraction, thereby preventing a ghost from developing in a stereoscopic image.

As an alternative, it is also possible to use a screen hot-press or extrusion molded from a resin plate of such a material as polymethyl methacrylate resin. This screen, due to the stress distortion likely to be left after the molding of the resin plate, often develops the double refraction of the screen and a ghost in the stereoscopic image depending on the molding conditions. It is possible, however, to keep the ghost on the screen below a detection limit for practical purposes if the relative phase difference (retardance) $\delta = \Delta n \cdot d$ between the normal and abnormal light rays leaving the screen is kept below $\lambda/(10\pi)$ [$\pi \approx 3.14$] as the molding conditions where $\Delta n$ is the double refraction of the screen (the difference between the refractive index $n_1$ along the axial direction of the linearly polarized normal light ray entering the screen and the refractive index $n_2$ along the axial direction of the linearly polarized abnormal light ray entering the screen: $\Delta n = n_2 - n_1$), d the thickness of the screen, and $\lambda$ the wavelength of the entrant light ray.

If the double refraction of the screen is to be reduced, on the other hand, the molded screen may be annealed to release the mechanical stress distortion effectively.

Now, the operation of reproducing a non-stereoscopic image according to the present embodiment will be explained with reference to FIG. 1B.

In FIG. 1B, the signal source 1 is formed of a video player, for example, as a television signal source of a non-stereoscopic image. The image signal of a non-stereoscopic image produced from the signal source 1 is supplied to the input terminal 2.

Numeral 14 designates a mode switch for switching between stereoscopic and non-stereoscopic images. This switch is turned to the non-stereoscopic image reproduction side when a non-stereoscopic image is to be reproduced. Then, the contacts 3B and 3C of the switch 3 are electrically connected, and the support frame 9 of the polarizing filters 8, 8' revolves around the pivot 10 thereby to remove the polarizing filters 8, 8' from the fronts of the projections lenses 6R, 6G, 6B and the projection lenses 6R', 6G', 6B' respectively at the same time.

On the other hand, the image signal of a non-stereoscopic image supplied to the input terminal 2 is applied through the contacts 3B, 3C of the switch 3 and the signal circuit 4 to the signal circuit 4', with the result that the PRTs 5R, 5G, 5B and PRTs 5R', 5G', 5B' are driven by the same non-stereoscopic image signal. Thus, the projection rays 18, 18' of the same image contents are projected on the transparent screen 13 by the projection lenses 6R, 6G, 6B and the projection lenses 6R', 6G', 6B', so that the brightness on the transparent screen 13 is given as the sum of the brightnesses of the projection light 18 and the projection light 18'.

The polarized glasses 16 shown in FIG. 1A are not required for reproducing a non-stereoscopic image.

As explained above, the support frame 9 holding the polarizing filters 8, 8' is removed from the fronts of the projection lenses 6R, 6G, 6B and 6R', 6G', 6B', and therefore the projection light rays 18, 18' are not absorbed by the polarizing filters 8, 8'. If a linearly polarized plate having a transmittance of 41% (such as G1220DU of Nitto Denko Co., Ltd.) is used as the polarizing filters 8, 8', therefore, it is possible to improve the brightness of the transparent screen 13 by a factor of 2.4 as compared with when the polarizing filters 8, 8' are arranged on the front of the projection lenses 6R, 6G, 6B and 6R', 6G', 6B'.

Although the azimuths of the plane of polarization of the linearly polarized plate of the polarizing filters 8, 8' are set to +45 and −45 degrees respectively according to the present embodiment, the present invention is not limited to such angles but may instead employ such figures as 0 and 90 degrees for differentiating the azimuths of the polarization planes of the linearly polarized plates of the polarizing filters 8 and 8' by 90 degree in relative fashion from each other.

Also, the linearly polarized plates used as the polarizing filters 8, 8' may be replaced with equal effect by circular polarized plates. Specifically, the use of a counterclockwise circular polarized plate as the left-eye polarizing filter 8 and a clockwise circular polarized plate as the right-eye polarizing filter 8', for example, permits the reproduction of a stereoscopic image in similar fashion.

Figure 3A:
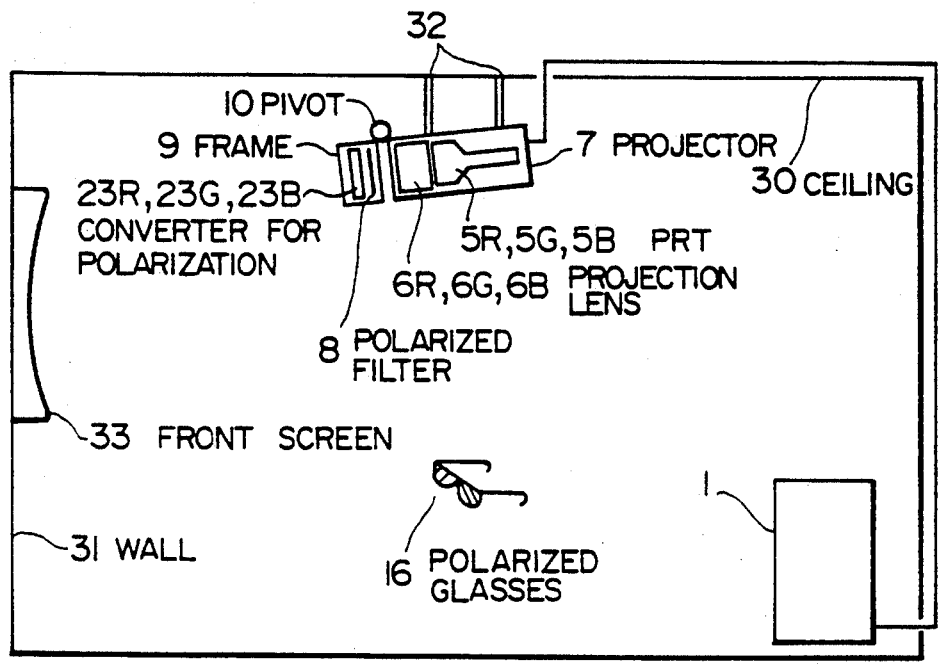
FIGS. 3A and 3B are diagrams for explaining a configuration of a projection-type stereoscopic image display system according to another embodiment of the present invention.
Figure 3B:
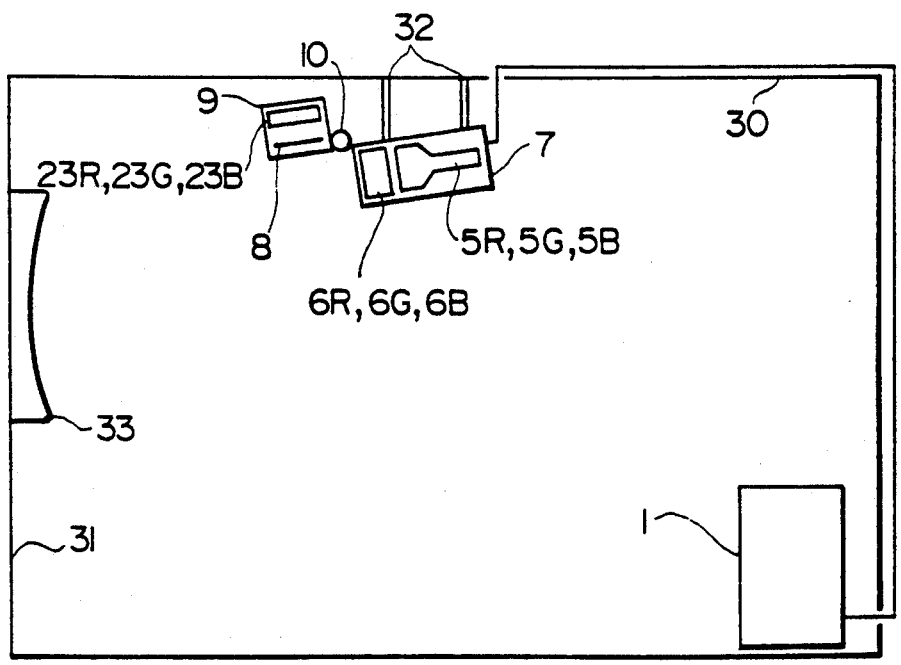

FIGS. 3A, 3B are diagrams for explaining a configuration of a projection-type stereoscopic image display system according to another embodiment of the present invention, of which FIG. 3A shows the condition of reproducing a stereoscopic image and FIG. 3B that of reproducing a non-stereoscopic image.

In FIGS. 3A and 3B, the component parts corresponding to those in FIGS. 1A and 1B are designated by the same reference numerals respectively as in FIGS. 1A and 1B.

In FIGS. 3A and 3B, a signal source 1 is provided by a video disk player for reproducing an image signal from an optical disk, for example, having recorded therein the left-eye signal L and the right-eye signal R providing a stereoscopic image signal or an optical disk having recorded therein a non-stereoscopic image signal.

First, the operation for reproducing a stereoscopic image in this embodiment will be explained with reference to FIG. 3A.

In FIG. 3A, the signal source 1 reproduces an image signal from an optical disk having recorded therein the left-eye signal L and the right-eye signal R providing a stereoscopic image signal. The left-eye signal L and the right-eye signal R thus reproduced are switched from each other in time division and are supplied as a single time-division signal to a projector 7 from the signal source 1.

The projector 7 includes three PRTs 5R, 5G, 5B for red, green and blue colors respectively with three projection lenses 6R, 6G, 6B, and is secured on the ceiling 30 with a support 32. Also, each of the PRTs 5R, 5G, 5B and the projection lenses 6R, 6G, 6B of the projector 7 has on the front thereof a polarizing filter 8 and polarizing axis converters 23R, 23G, 23B arranged on and held by a support frame 9. The support frame 9 is secured on and rotatable around a pivot 10.

The polarizing filter 8 has a linearly polarized plate with the azimuth of the plane of polarization set to +45 degree, and therefore the linearly polarized light ray that has passed through the polarizing filter 8 has an azimuth of the plane of polarization at +45 degree. Also, the polarization axis converters 23R, 23G, 23B are made of a twist nematic liquid crystal or PLZT (Lead Lanthanum Zirconate Tintanate; a transparent ferroelectric substance composed of metal elements Pb, La, Zr, Ti) or the like and is used for changing the azimuth of the plane of polarization of the linearly polarized light ray that has passed through the polarizing filter 8.

Specifically, when no control voltage is applied to the polarization axis converters 23R, 23G, 23B, the linearly polarized incident light ray is emitted without changing the azimuth of the plane of polarization thereof from +45 degree. When a control voltage is applied to the polarization axis converters 23R, 23G, 23B, on the other hand, the linearly polarized incident light ray has the plane of polarization thereof rotated to change the azimuth thereof by approximately 90 degree to −45 degree before leaving the converters 23R, 23G, 23B. As a result, if the left-eye signal L and the right-eye signal R are switched at the signal source 1 in synchronism with the switching operation of the azimuth of the plane of polarization at the polarization axis converters 23R, 23G, 23B, therefore, the left- and right-eye projection light rays are emitted from the polarization axis converters 23R, 23G, 23B alternately in time division with the azimuths of the plane of polarization thereof differentiated by 90 degree from each other.

The projection light emitted from the polarization axis converters 23R, 23G, 23B is projected on a front screen 33 of aluminum film, for example, installed on a wall 31 thereby to form left- and right-eye images alternately in time division on the front screen 33.

The viewer watches the images projected on the front screen 33 by use of polarized glasses set to +45 and −45 degrees in azimuth of the plane of polarization. Since the plane of polarization of the left-eye polarizing plate of the polarized glasses 16 is set to coincide with that of the left-eye projection light, the left-eye projection light ray enters the left eye without being absorbed into the left-eye polarizing plate. In view of the fact that the left-eye projection light ray has an azimuth 90 degree different from the plane of polarization of the right-eye polarizing plate of the polarized glasses 16, on the other hand, the left-eye projection light ray is absorbed into and interrupted by the right-eye polarizing plate and thus is unable to reach the right eye. In similar fashion, the right-eye projection light enters only the right eye but not the left eye.

After all, the left- and right-eye images projected alternately in time division enter only the left and right eyes respectively, and it is thus possible to reproduce a stereoscopic image having a sense of depth due to the parallax between the two eyes.

Now, the operation of reproducing a non-stereoscopic image in this embodiment will be explained with reference to FIG. 3B.

In FIG. 3B, the signal source 1 reproduces a video signal (image signal) from the optical disk having recorded therein a video signal of a non-stereoscopic image. The video signal of a non-stereoscopic image (normal video signal) thus reproduced is continuously supplied to the projector 7 from the signal source 1.

Also, the projector 7 has a mode discriminating circuit (not shown) for deciding whether a supplied video signal is associated with a stereoscopic or non-stereoscopic signal.

If the video signal supplied is for a non-stereoscopic image, the mode discriminating circuit produces a control signal to rotate the support frame 9 having secured thereon the polarization axis converters 23R, 23G, 23B and the polarizing filter 8 around the pivot 10 and urges the whole support frame 9 upward. This control process causes the polarization axis converters 23R, 23G, 23B and the polarizing filter 8 from the front of the projection lenses 6R, 6G, 6B when a video signal of a non-stereoscopic image is supplied to the projector 7, so that the projection light rays released from the PRTs 5R, 5G, 5B are not absorbed into the polarizing filter 8 and the polarization axis converters 23R, 23G, 23B thereby to produce a bright image on the front screen 33.

Specifically, according to the present embodiment, assume that the polarizing filter 8 has a transmittance of 41%, and the polarization axis converters 23R, 23G, 23B a transmittance of 70%. Then it is possible to improve the screen brightness by a factor of about 3.7 when the polarizing filter 8 and the polarization axis converters 23R, 23G, 23B are removed from the projection lenses 6R, 6G, 6B than when they are removed.

The azimuth of the plane of polarization of the linearly polarized plate in the polarizing filter 8, which is set to +45 degree in this embodiment, is not necessarily limited to such an angle according to the invention.

Also, the linearly polarized plate which is used as the polarizing filter 8 in this embodiment may be replaced by a circular polarized plate with equal effect.

Figure 4B:
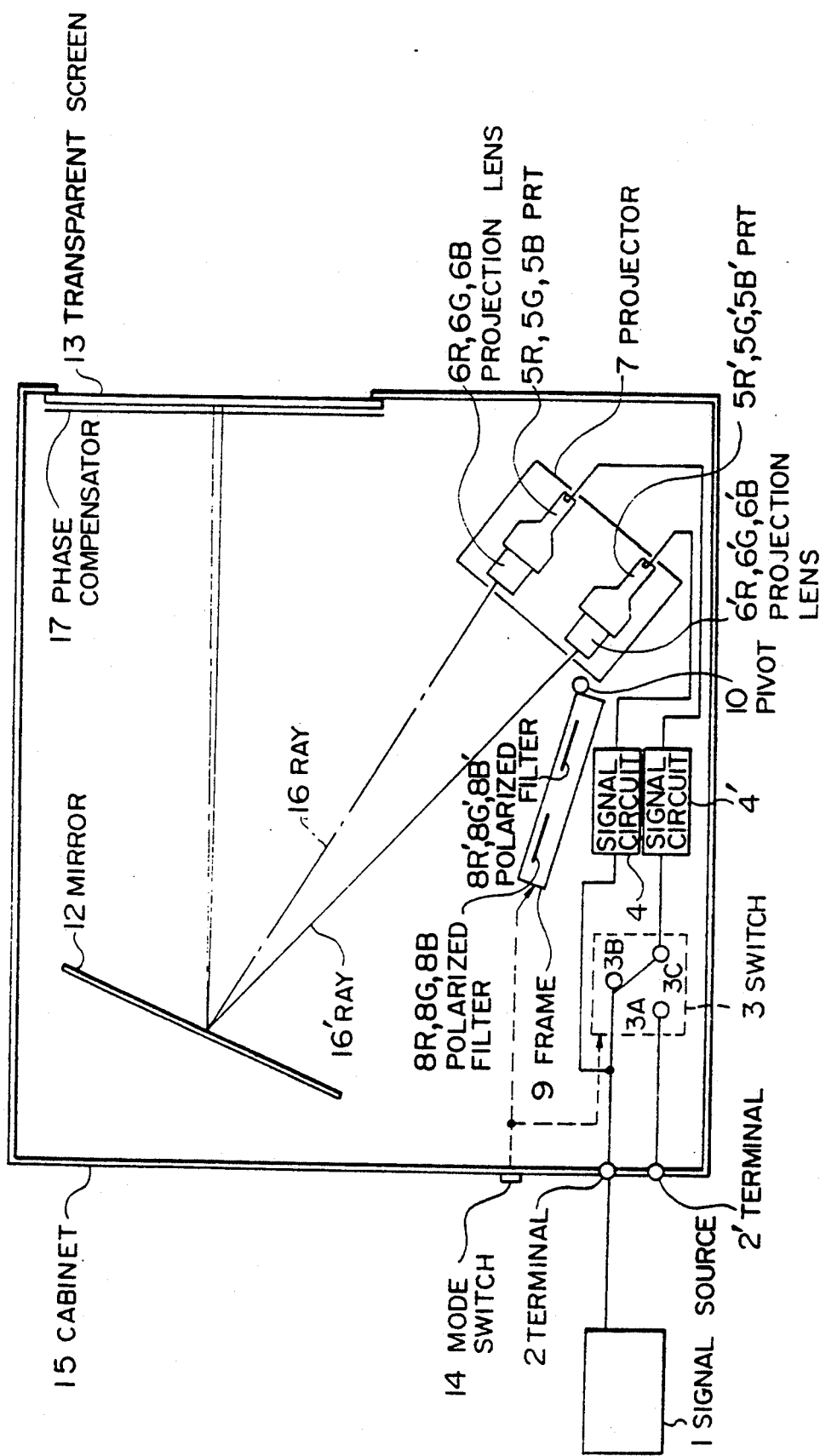
Figure 5:
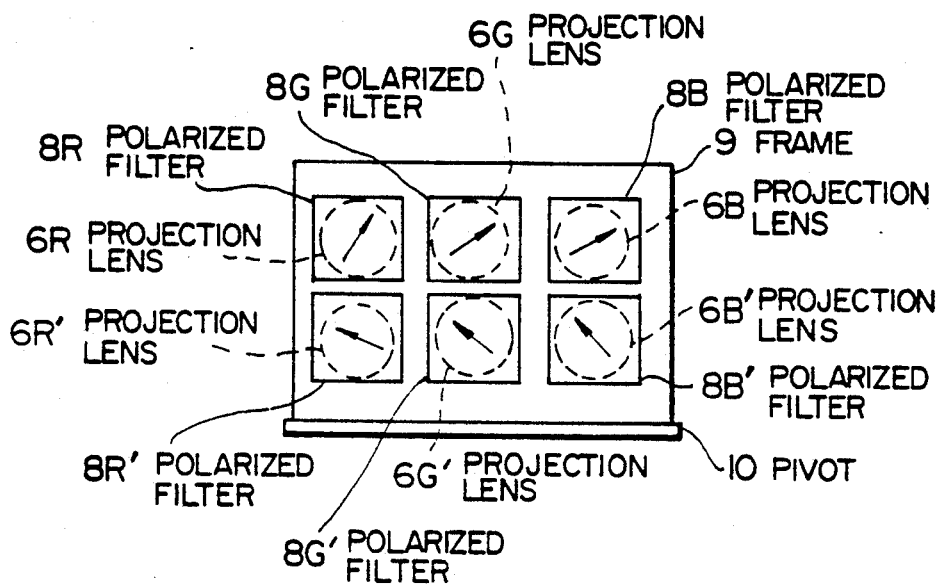
FIG. 5 is a front view of the projector in FIG. 4.

FIGS. 4A, 4B are diagrams for explaining a configuration of a projection-type stereoscopic image display system as another embodiment of the present invention. FIG. 4A illustrates the condition of reproducing a stereoscopic image, and FIG. 4B that of reproducing a non-stereoscopic image. FIG. 5 is a front view showing the projector in FIGS. 4A and 4B.

In FIGS. 4A, 4B and 5, the component parts corresponding to those in FIGS. 2A, 2B are designated by the same reference numerals as in FIGS. 2A, 2B respectively.

The present embodiment is different from the embodiment of FIGS. 1A, 1B in that according to the present embodiment, firstly, a phase compensator 17 is arranged behind the transparent screen 13 and secondly, three polarizing filters 8R, 8G, 8B having different azimuths of the plane of polarization of the linearly polarized plate corresponding to the projection lenses 6R, 6G, 6B respectively, and polarizing filters 8R', 8G', 8B' having different azimuths of the plane of polarization of linearly polarized plates corresponding to the projection lenses 6R', 6G', 6B' respectively, are arranged in the support frame 9.

In this embodiment, the operation of reproducing a non-stereoscopic image is similar to that in the embodiment of FIG. 1 and will not be explained. The operation of reproducing a stereoscopic image is also fundamentally similar to that in the embodiment shown in FIG. 1, and therefore only those points of operation different from the operation of the embodiment shown in FIG. 1 will be explained below.

Generally, the transparent screen of a rear projection-type image display system is often configured of a combination of a plastics lenticular screen and a plastics fresnel screen. The lenticular screen is fabricated by the extrusion molding of a resin plate of such a material as polymethyl methacrylate, and the fresnel screen by the hot press molding of the same resin plate.

As described above, a screen made by the extrusion or hot press molding of a resin plate of such a material as polymethyl methacrylate is likely to develop a double refraction due to the stress distortion which easily remains after molding. Especially, in the case of a fresnel screen, the stress distortion due to the molding process is liable to remain along the peripheral portions thereof leading to a double refraction. As a result, if the left-eye projection light ray 11 and the right-eye projection light ray 11' making up the linearly polarized light rays pass the peripheral portions, the double refraction makes it impossible to maintain the plane of polarization resulting in an ellipically polarized light ray. If the left-eye projection light 11 and the right-eye projection light 11' become elliptically polarized light rays in this way, the reproduced stereoscopic image develops a double vision posing the problem of what is called the ghost.

To cope with this problem, certain limitations are imposed on the molding conditions in the embodiment shown in FIG. 1. According to the present embodiment, on the other hand, the phase compensator 17 is used to obviate the same problem.

More specifically, according to the present embodiment, a lenticular screen formed by the extrusion molding of a resin plate of such a material as polymethyl methacrylate is combined with a fresnel screen made by the hot press molding of the same material, with a double refraction developing along the peripheral portions of the fresnel screen.

The phase compensator 17, on the other hand, is an optically double refractive member made of a transparent plastics film (such as a thin film of cellulose oxide). A linearly polarized ray entering the phase compensator 17, therefore, leaves the same split into two perpendicularly-crossing polarized light components, that is, a normal light ray and an abnormal light ray (both linearly polarized). The relative phase differences (retardance) between the emitting normal and abnormal light rays may be controlled by the stress distortion applied to the phase compensator 17.

Figure 6:
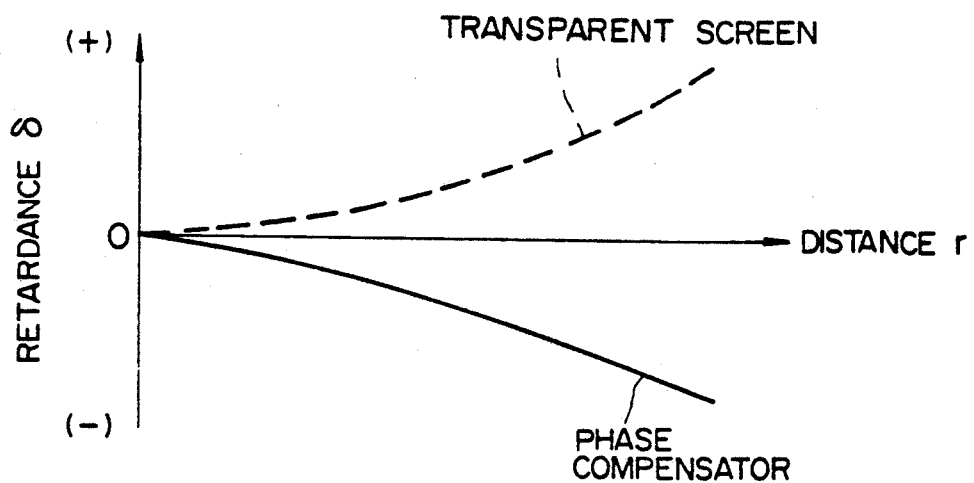
FIG. 6 is a characteristics diagram showing the relationship between the retardance δ of the transparent screen and the phase compensator and the distance r from the optical axis of the projection light ray passed therethrough.

FIG. 6 is a characteristic diagram showing the relationship between the retardance $\delta$ of the transparent screen and the phase compensator and the distance r from the optical axis of the projection light rays transmitted therethrough.

In FIG. 6, the dashed line indicates the transparent screen 13, and the solid line the phase compensator 17. The point zero of the distance r is set at the position of the optical axis of the transmitted transparent light rays (that is, the center of the screen surface for the transparent screen 13, and the center of the plate for the phase compensator 17).

The transparent screen 13 exhibits the characteristic of the retardance thereof gradually increasing from the center toward the peripheral portions of the screen surface as shown in FIG. 6 since the stress distortion of the molding of the fresnel screen is conspicuous along the peripheral portions.

The phase compensator 17, on the other hand, has such a characteristic that the retardance thereof gradually increases from the center of the plate toward the peripheral portions thereof as it has a retardance opposite in sign to that of the transparent screen 13 as shown in FIG. 6.

As a result, the linearly polarized light rays resulting from the left-eye projection ray 11 and the right-eye projection ray 11' that have left the polarizing filters 8R, 8G, 8B, 8R', 8G', 8B', upon passing the phase compensator 17, are elliptically polarized due to the double refraction thereof. When these elliptically polarized left-eye projection light ray 11 and the right-eye projection light ray 11' leaving the phase compensator 17 enter the transparent screen 13, the phase difference therebetween is cancelled due to the sign of the retardance of the transparent screen 13 opposite to that of the phase compensator 17, with the result that the left-eye projection ray 11 and the right-eye projection ray 11' are emitted linearly polarized from the transparent screen 13.

The use of the polarized glasses 16, therefore, permits the left- and right-eye images to be separated from each other, and thus makes it possible to reproduce a stereoscopic image with a sense of depth free of ghost.

It was described above with reference to the embodiment of FIG. 1 that when the left- and right-eye images projected on the transparent screen 13 are viewed through the polarized glasses 16, the left-eye projection ray 11 passed through the transparent screen 13 having a plane of polarization 90 degree different from the right-eye polarizing plate of the polarized glasses 16 is absorbed into and interrupted by the right-eye polarizing plate and thus fails to reach the right eye, while the right-eye projection ray 11 having a plane of polarization 90 degree different from the left-eye polarizing plate of the polarized glasses 16 is absorbed into and interrupted by the left-eye polarizing plate and thus fails to reach the left eye.

Actually, however, the left-eye projection ray 11 and the right-eye projection ray 11', even through having a plane of polarization 90 degree different from the polarizing plate of the polarized glasses 16, are not necessarily absorbed into and interrupted by the polarizing plate in its entirety. Specifically, some portion of the left-eye projection light ray 11 and the right-eye projection light ray 11', depending on the wavelength thereof, may be transmitted through the polarizing plate without being absorbed or interrupted.

This is due to the fact that the angle between the planes of polarization of the polarizing plate and the light rays at which the light rays are entirely absorbed and interrupted is not fixed at 90 degree but is somewhat dependent on the wavelength of the light rays involved.

In view of this, according to the present embodiment, as described above, the left-eye projection light rays 11 leaving the projection lenses 6R, 6G, 6B are polarized by the polarizing filter 8R for the red light, by the polarizing filter 8G for the green light and by the polarizing filter 8B for the blue light. At the same time, the left-eye projection light rays 11' leaving the projection lenses 6R', 6G', 6B' are polarized by the polarizing filter 8R' for the red light, by the polarizing filter 8G' for the green light and by the polarizing filter 8B' for the blue light.

In addition, the azimuth of the plane of polarization of the linearly polarized plate of each of the polarizing filters 8R, 8G, 8B is adjusted in such a manner as to maximize the absorption and interruption by the right-eye polarizing plate of the polarized glasses 16 for each of the red, green and blue light components of the left-eye projection light ray 11 that has passed through the transparent screen 13, while at the same time adjusting the azimuth of the plane of polarization of the linearly polarized plate of each of the polarizing filters 8R', 8G', 8B' in such a manner as to maximize the absorption into and interruption by the left-eye polarizing plate of the polarized glasses 16 for each of the red, green and blue components of the right-eye projection light ray 11'.

As a consequence, when the left- and right-eye images projected on the transparent screen 13 are viewed through the polarized glasses 16, most of the left-eye projection ray 11 that has passed through the transparent screen 13 is absorbed into and interrupted by the right-eye polarizing plate of the polarized glasses 16 and thus fails to reach the right eye, while the right-eye projection ray 11' is absorbed into and interrupted for the most part by the left-eye polarizing plate of the polarized glasses 16 failing to reach the left eye.

In each of the embodiments described above, a projector 7 having a PRT is used, and it is obvious that a liquid crystal projector having a liquid crystal display panel may be used in place of the projector 7.

EFFECT OF THE INVENTION

According to the present invention, a transparent screen is used, and the left-eye projection light ray and the right-eye projection light ray are projected from behind the transparent screen to display left- and right-eye images, thereby making it possible to reproduce a stereoscopic image with high contrast without being affected by the external light.

If a plastics screen is used as the transparent screen, the double refraction attributable to the residual mechanical stress distortion of the screen molding poses the problem of double vision of a reproduced stereoscopic image. According to the present invention, the problem is solved by using a transparent plastics screen having a small double refraction produced by optimizing the method or conditions of molding or post-molding process.

Also, even when a screen having a double fraction is used as a transparent plastics screen, the same problem is obviated by the use of a phase compensator to compensate for the double refraction of the screen according to the present invention. In this case, the production of the screen is facilitated.

Further, according to the present invention, a sufficient screen brightness is secured even for reproducing a non-stereoscopic image, thus making it possible to view an image on a bright screen.

Other embodiments of the present system and polarized glasses will be explained with reference to FIGS. 7 to 23.

Figure 7:
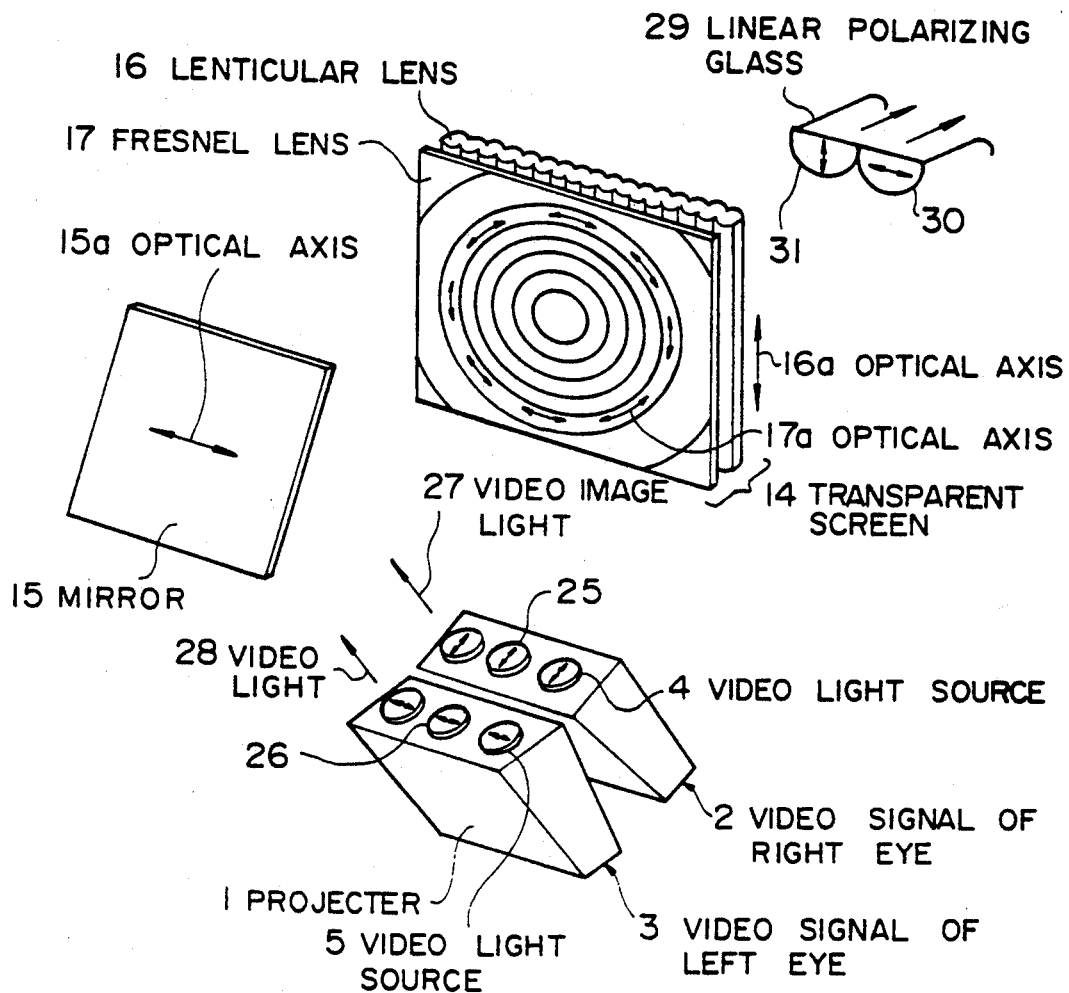
FIG. 7 is a perspective view showing still another embodiment of the stereoscopic image display system according to the present invention.

An embodiment of a rear projection-type projector providing a stereoscopic image display system according to the present invention is shown in FIG. 7. As compared with the rear projection-type projector shown in FIGS. 19 and 20, horizontal/vertical polarizing filters 25, 26 are used in place of conventional +45/−45 degree linearly polarizing filters 18, 19 or clockwise/counterclockwise circular polarizing filters 6, 7 as video light sources 4, 5.

More specifically, the video light source 4 has mounted thereon the vertical linearly polarizing filter 25, and the video light source 5 the horizontal linearly polarizing filter 26. The video light ray 27 led from the video light source 4 is a vertical linearly polarizing ray, and the video light ray 28 led from the video light source 5 is a horizontal linearly polarized light ray. The two sets of video light rays 27, 28 are reflected from the mirror 15, and are combined in a transparent screen 14 providing a video combination surface. Since the direction of polarization is horizontal/vertical, the video light ray 27 remains a vertical linearly polarized light ray and the video light ray 28 a horizontal linearly polarized light ray even after reflection from the mirror 15. The linearly polarized glasses 29 have a horizontal linearly polarizing filter 30 and a vertical linearly polarizing filter 31 for the left and right eyes respectively, so that the combined video light rays 27 and 28 may be viewed separately.

The optical axis 15a of the mirror 15 is horizontal and is parallel or perpendicular to the direction of polarization of the video light sources 4, 5. On the other hand, the optical axis 16a of the lenticular lens 16 is vertical and is parallel or perpendicular to the direction of polarization of the video light sources 4, 5. Since the optical axis 17a of the fresnel lens 17 is concentrically distributed, the optical axis 17a is parallel or perpendicular to the direction of polarization of the video light sources 4, 5 over an area from the center of the screen toward horizontal or vertical direction.

Figure 8:
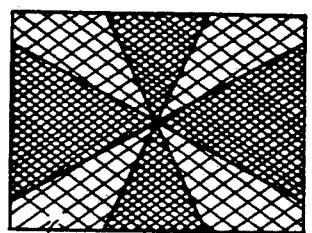
FIG. 8 is a front view of a transparent screen for explaining the effect of the same embodiment.

FIG. 8 shows a combination of a solid white right-eye image 2 and a solid black left-eye image 3 as viewed with only the left eye in the system shown in FIG. 7. The system of FIG. 18 using the horizontal/vertical linearly polarizing filters 25, 26 develops less leakage than the system of FIG. 22 including the clockwise/counterclockwise circular polarizing filters 6, 7 or the system of FIG. 23 using the +45/−45 degree linearly polarizing filters 18, 19, except in the area toward ±45 degree from the center of the screen where only the optical axis 17a of the fresnel lens 17 forms an angle of ±45 degree with the direction of polarization of the video light sources 4, 5. In this way, the greater part of the screen is solid black and therefore a superior stereoscopic image is visible.

In the system of FIG. 7, if the double reflection of the fresnel lens 17 is reduced as compared with that of the lenticular lens 16, the whole screen becomes solid black, so that a better stereoscopic image is produced even in an area where the direction of the optical axis is not parallel or perpendicular to the direction of polarization of the video light source.

In order to secure the above-mentioned relationship, the lenticular lens 16 is fabricated by the extrusion molding superior in mass productivity through accompanied by a larger double refraction, and the fresnel lens by the photopolymerization or the process of what is called "2p" using an ultraviolet ray-setting resin as a casting base plate small in double fraction. As an alternative method, the fresnel lens 17 may be fabricated directly by the cutting of a casting base plate small in double fraction.

The above-mentioned relationship is not limited to the fresnel lens 17 and the lenticular lens 16. Specifically, a similar effect is obtained to the extent that the phase difference of double refraction of an optical element such as the fresnel lens 17 having an irregular direction of an optical axis is reduced as compared with that of an optical element like the lenticular lens 16 having a regular direction of an optical axis.

Although the transparent screen 14 is configured of the lenticular lens 16 and the fresnel lens 17 in the embodiment shown in FIG. 7, the present invention is not limited to such a configuration.

Figure 9:
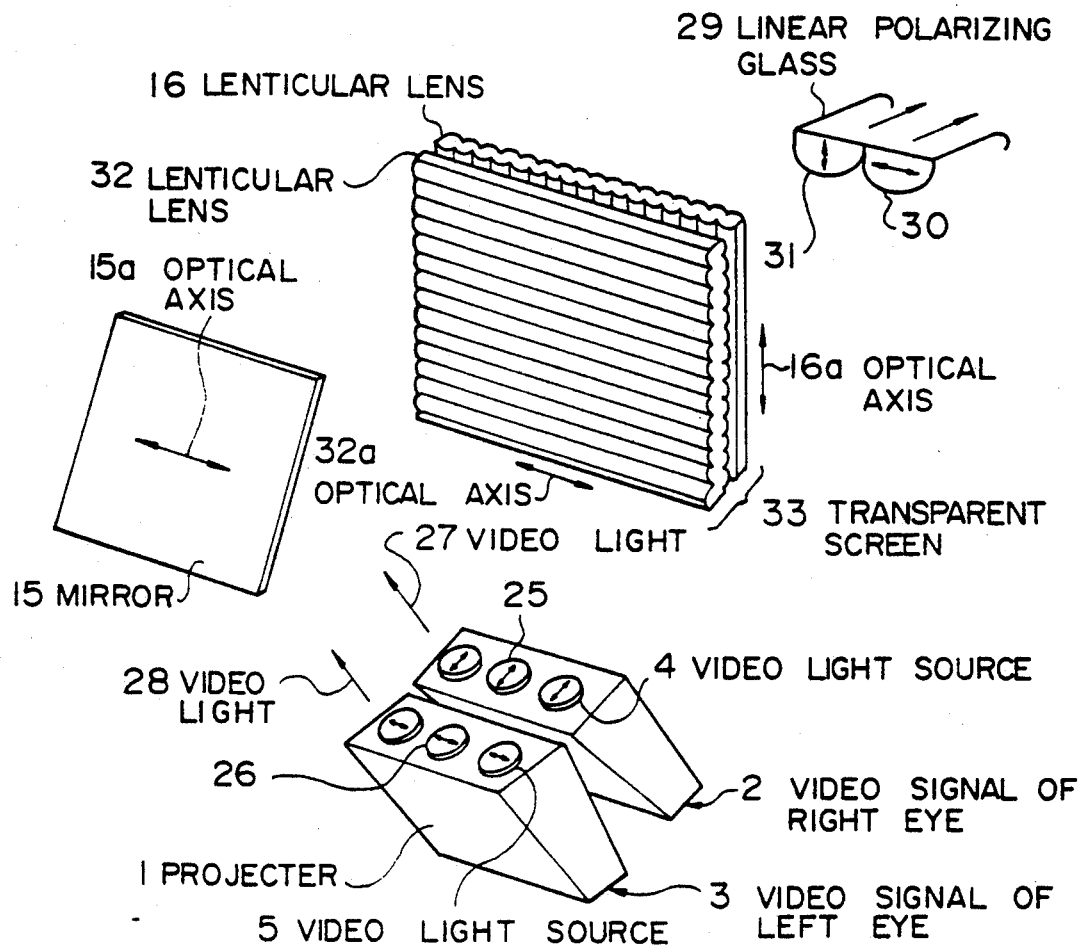
FIG. 9 is a perspective view showing a further embodiment of the stereoscopic image display system according to the present invention.

FIG. 9 shows still another embodiment of a rear projection-type projector providing a stereoscopic image display system according to the present invention. As compared with the rear projection-type projector shown in FIG. 7, the transparent screen including the lenticular lens 16 and the fresnel lens 17 are replaced in this embodiment by a transparent screen 33 including a pair of lenticular lenses 16, 32 arranged at positions 90 degree different from each other. In this embodiment, in place of the fresnel lens 17 with the optical axis 17a distributed concentrically, the lenticular lens 32 having a horizontal optical axis 32a in a position parallel or perpendicular to the direction of polarization of the video light sources 4, 5 is employed. As a result, all the optical axes 15a, 16a, 32a become parallel of perpendicular to the direction of polarization of the video light sources 4, 5.

Figure 10:
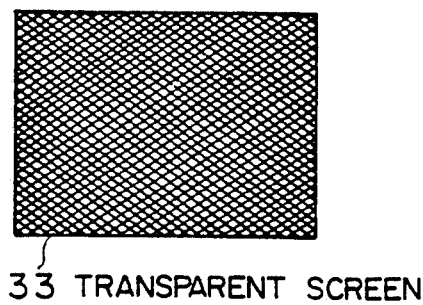
FIG. 10 is a front view of a transparent screen for explaining the effect of the same embodiment.

FIG. 10 shows a combined image of the solid white right-eye image 2 and the solid black left-eye image 3 as viewed only with the left eye in the system of FIG. 9. In the system of FIG. 10 using the transparent screen 33 configured of two lenticular lenses 16, 32, there is less leakage than the configuration shown in FIG. 8 using the transparent screen 14 including the lenticular lens 16 and the fresnel lens 17. In the configuration of FIG. 10, the whole screen becomes solid black to the same extent as the system of FIG. 21 using a front projection-type projector, and therefore a better stereoscopic image is produced.

Figure 11:
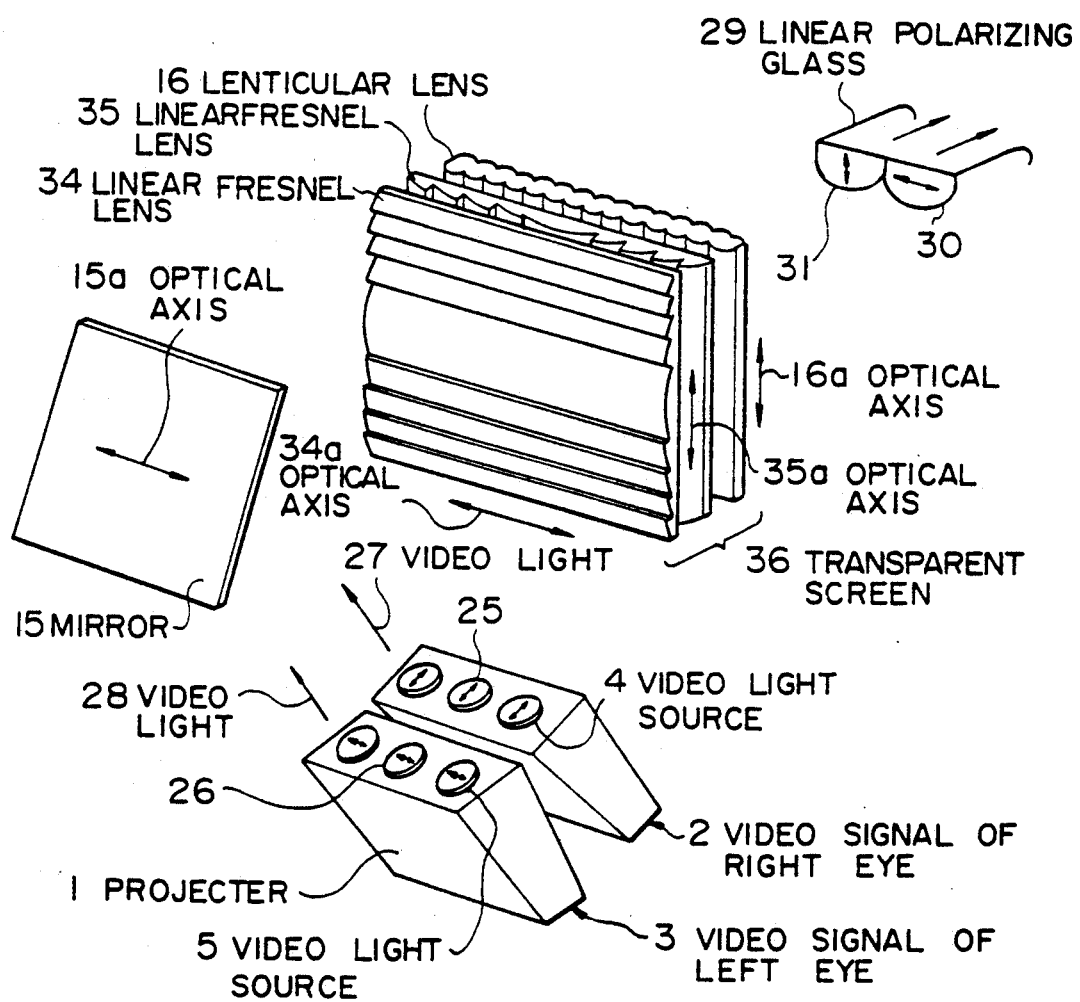
FIGS. 11 and 12 are perspective views showing still other embodiments of the stereoscopic image display system according to the present invention.

FIG. 11 shows a further embodiment of a rear projection-type projector providing a stereoscopic image display system according to the present invention. Unlike in the rear projection-type projector shown in FIG. 7, a transparent screen 14 including the lenticular lens 16 and the fresnel lens 17 is replaced by a transparent screen 36 configured of two linear fresnel lenses 34, 35 positioned 90 degree different from the lenticular lens 16. According to the present embodiment, the fresnel lens 17 with the optical axis 17a distributed concentrically is removed, and is replaced by the linear fresnel lenses 34, 35 having horizontal/perpendicular optical axes 34a, 35 in such a manner as to be parallel or perpendicular to the direction of polarization of the video light sources 4, 5, and therefore all the optical axes 15a, 16a, 34a, 35a are parallel or perpendicular to the direction of polarization of the video light sources 4, 5. Further, the two fresnel lenses 34, 35 have the function of convergence similar to that of a single fresnel lens 17. As a result, a stereoscopic image of a better quality is produced on the one hand, and the brightness along the peripheral portions of the screen is so improved by the convergence of light as compared with the system of FIG. 9 that a brightness comparable to that of the system shown in FIG. 7 is obtained on the other hand.

Although the embodiments shown in FIGS. 7, 9 and 11 use horizontal/vertical linearly polarized glasses 29 corresponding to the horizontal/vertical linearly polarizing filters 25, 26 mounted on the video light sources 4, 5, the present invention is not limited to this configuration as seen from the example explained below.

Figure 12:
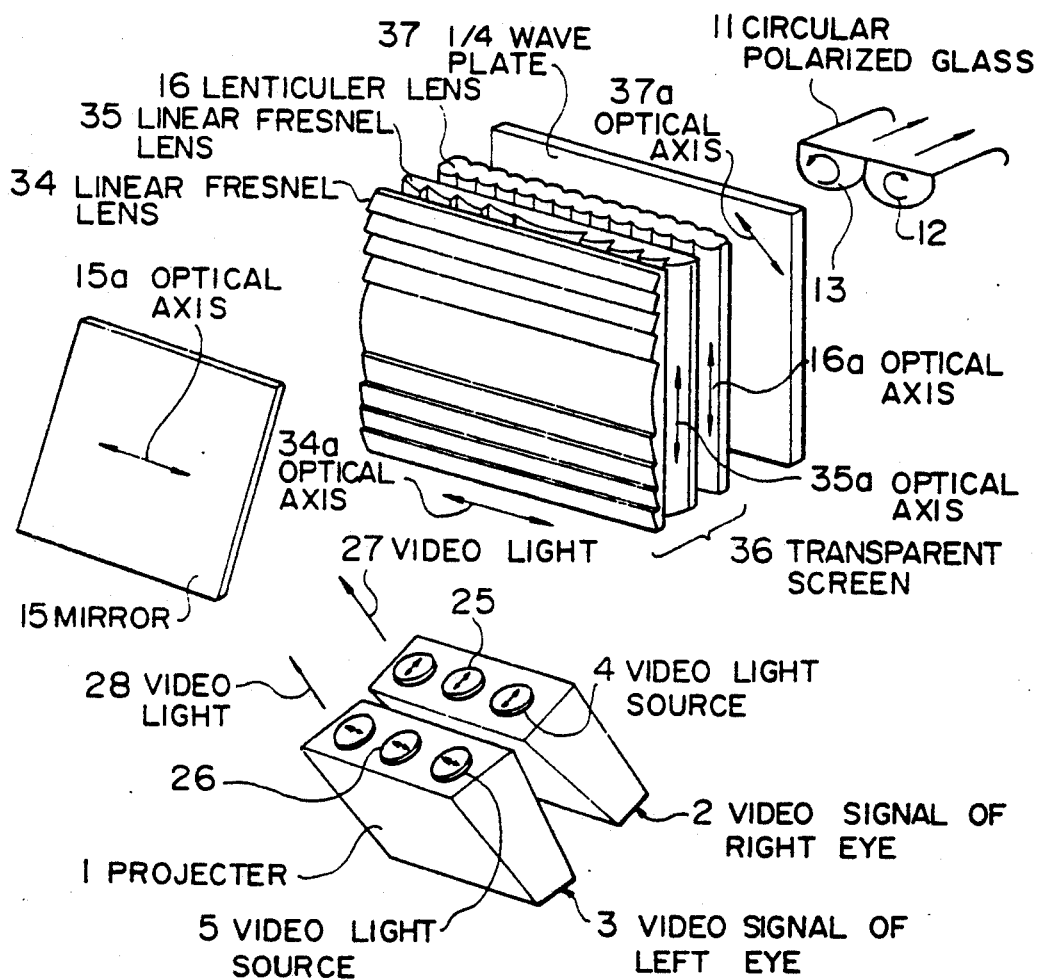

FIG. 12 is a diagram showing a further embodiment of the rear projection-type projector providing a stereoscopic image display system according to the present invention. As compared with the rear projection-type projector shown in FIG. 11, circular polarized glasses 11 are used in place of the linear polarized glasses 29, and a ¼ wave plate 37 with an optical axis 37a of double refraction forming an angle of 45 degree to the direction of polarization of the video light sources 4, 5 is inserted between the transparent screen 36 and the circular polarized glasses 11. According to the present embodiment, the circular polarization between the transparent screen 36 and the circular polarized glasses 11 does not change to the elliptical polarization for lack of an optical element having a double refraction. Also, the circular polarization makes a superior stereoscopic image visible regardless of any displacement of the polarization angle even when the viewer wearing the circular polarized glasses 11 tilts his head or views the transparent screen 36 from a direction displaced from the center of the screen.

The above-mentioned advantage that a superior stereoscopic image is visible even when the viewer with polarized glasses on tilts his head or views a combined image from a direction displaced from the screen center is not confined to the circular polarized glasses, but is also available with the linear polarized glasses, as seen from the example explained below.

Figure 13:
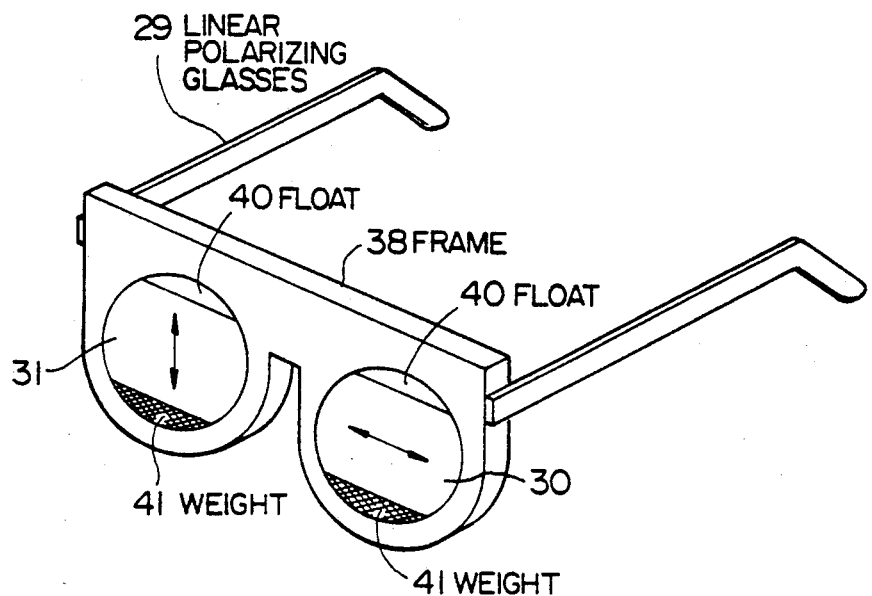
FIG. 13 is a perspective view of an embodiment of linearly polarized glasses used for a stereoscopic image display system according to the present invention.
Figure 14:
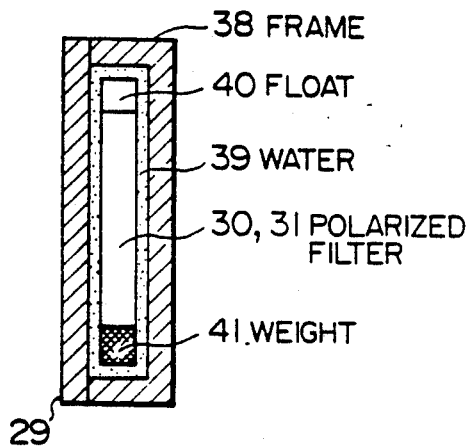
FIGS. 14 and 15 are a sectional view and a front view respectively of the essential parts of the linearly polarized glasses.
Figure 15:
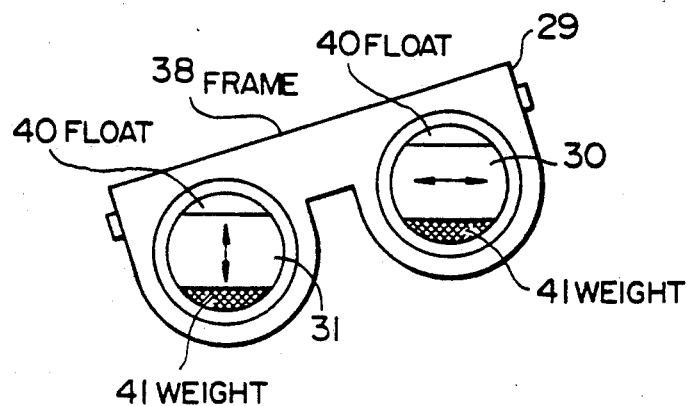

FIG. 13 is a perspective view of an embodiment of the linear polarized glasses 29 used with a stereoscopic image display system according to the present invention. FIG. 14 is a sectional view of the essential parts thereof. In FIGS. 13 and 14, horizontal/vertical linear polarizing filters 30, 31 are rotatably floated in the water 39 filled in the space of a glass frame 38. Further, the horizontal/vertical linear polarizing filters 30, 31 have a float 40 on the upper side thereof and a weight 41 on the lower side thereof so as to keep the same angle all the time in operation utilizing the gravity or buoyancy. As shown in FIG. 15, even if the glass frame 38 rotates with respect to the stereoscopic image display system with the viewer's head tilted, the horizontal/vertical linear polarizing filters 30, 31 of the linear polarized glasses 29 are never displaced from the optimum angle of polarization, thus making a satisfactory stereoscopic image visible.

The stereoscopic image display system is not limited to the above-mentioned display of a stereoscopic image which is a main application thereof. Another application will be explained below.

Figure 16:
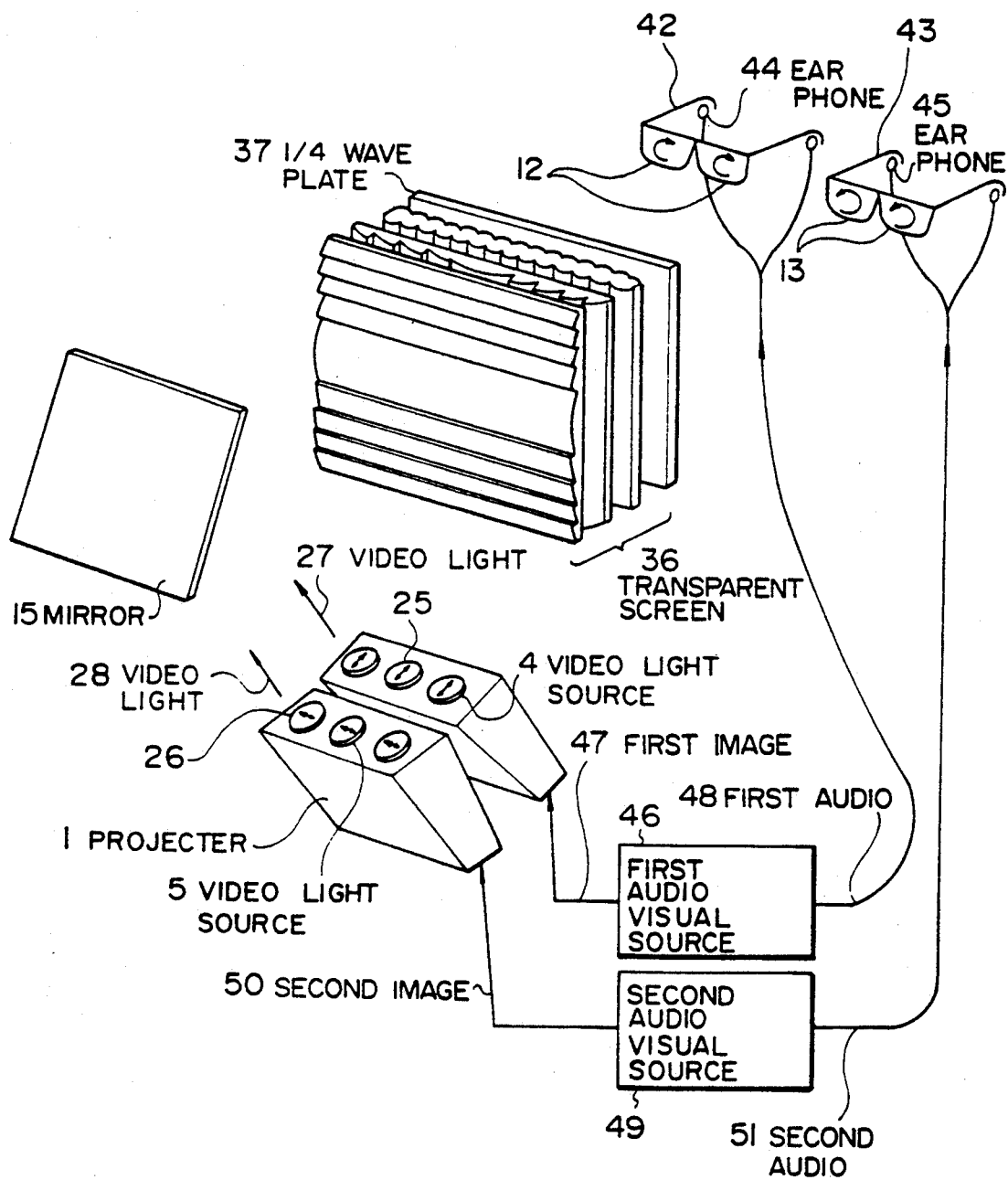
FIGS. 16 and 17 are perspective views showing other embodiments of the image display system according to the present invention.

FIG. 16 is a diagram showing an embodiment of the rear projection-type projector providing an image display system used for applications other than the display of a stereoscopic image according to the present invention. Unlike in the rear projection-type projector shown in FIG. 16, circular polarized glasses 42, 43 having the same direction of polarization for the left and right eyes are used instead of the circular polarized glasses 11 having different directions of polarization for the left and right eyes. Also, ear phones 44, 45 are used for the circular polarized glasses 42, 43 respectively. A first video 47 and a first audio 48 are supplied to the video light source 4 and the ear phone 44 from a first audio visual source 46, and a second video 50 and a second audio 51 to the video light source 5 and the ear phone 45 from a second audio visual source 49. According to the present embodiment, any one of the two videos 47 and 50 may be separated and viewed, and audios 48, 51 corresponding to the two videos 47, 50 may be heard independently. Therefore, a plurality of persons are able to enjoy both two separate videos and two audios by use of a single image display system at the same time.

According to the present system including two video light sources 4, 5, either a single image may be displayed as normal or two images may be displayed in superimposition and viewed with the glasses off, thus realizing the function of superimposition. The conventional function of superimposition is realized by combining video signals electrically and thus requires two video signals to be synchronized. The superimposition function according to the present invention, however, is realized by combining video light rays, and therefore the two video signals are not required to be synchronized. Also, unlike in the conventional superimposition function with which a plurality of persons are able to view only the same image, the superimposition function according to the present invention enables the person wearing one of the polarized glasses 42, 43 to view one of the two images 47, 50 separately from the other. If the first video 47 is supplied with a movie having no leader superimposition and the second video 50 with a movie having a leader superimposition, for example, the viewer not wearing the polarized glasses 42 can view the movie with the leader superimposition, and only the person wearing the polarized glasses 42 may view the movie without the leader superimposition.

Figure 17:
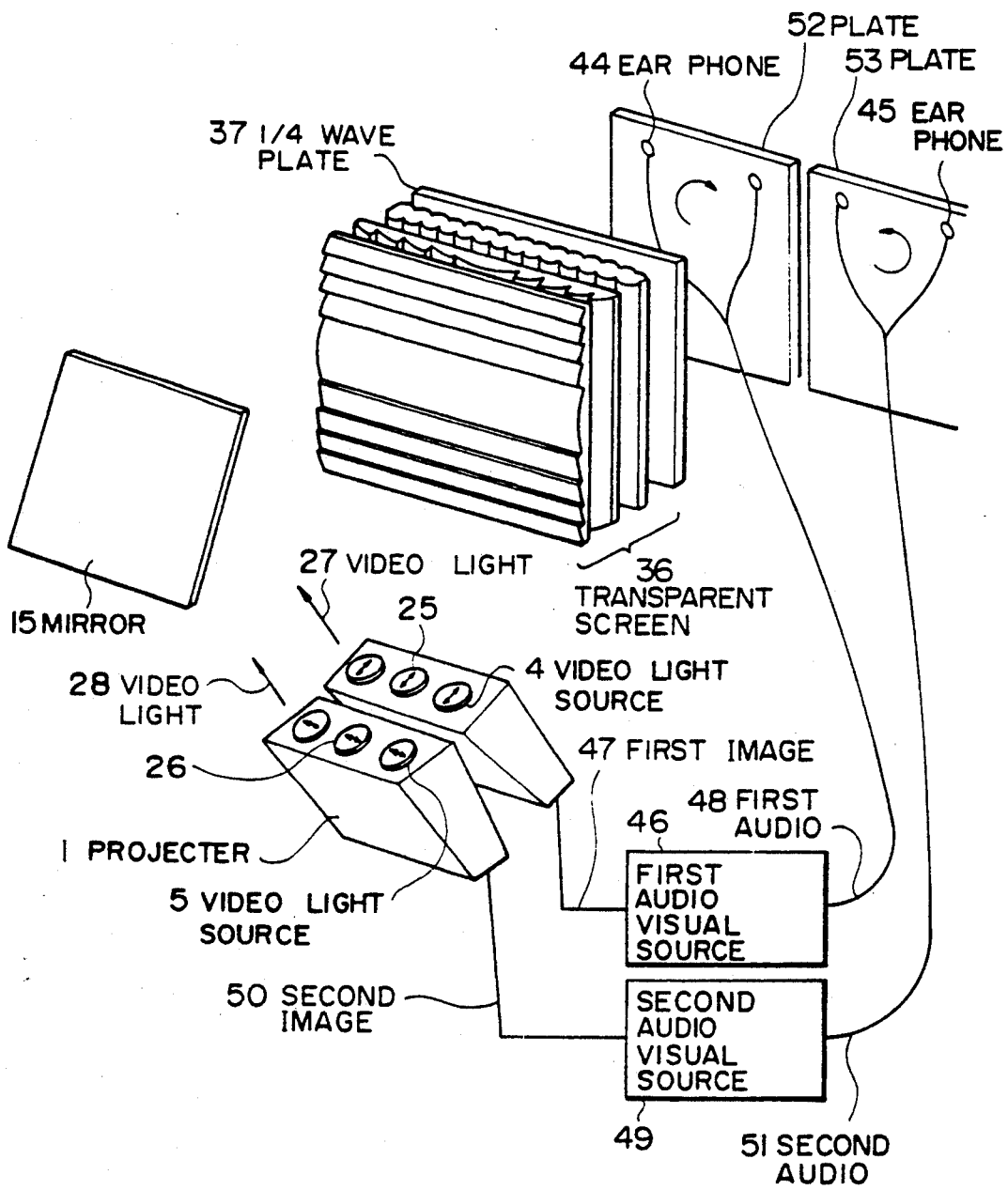
Figure 18:
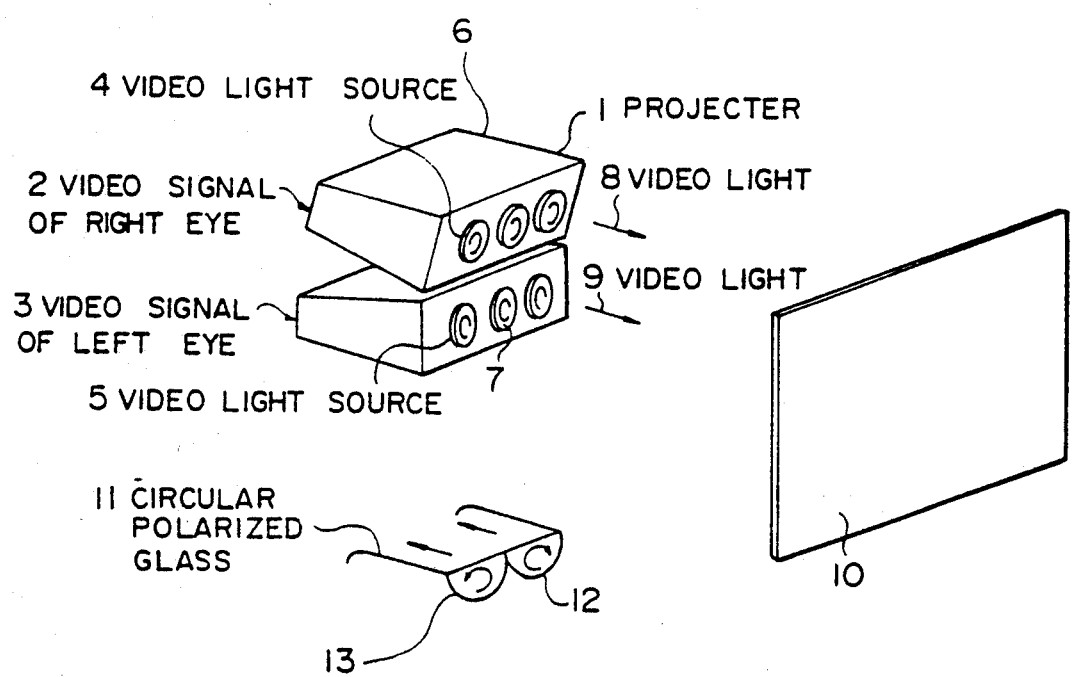
FIGS. 18 and 19 are perspective views of examples of a conventional stereoscopic image display system according to the prior art.
Figure 19:
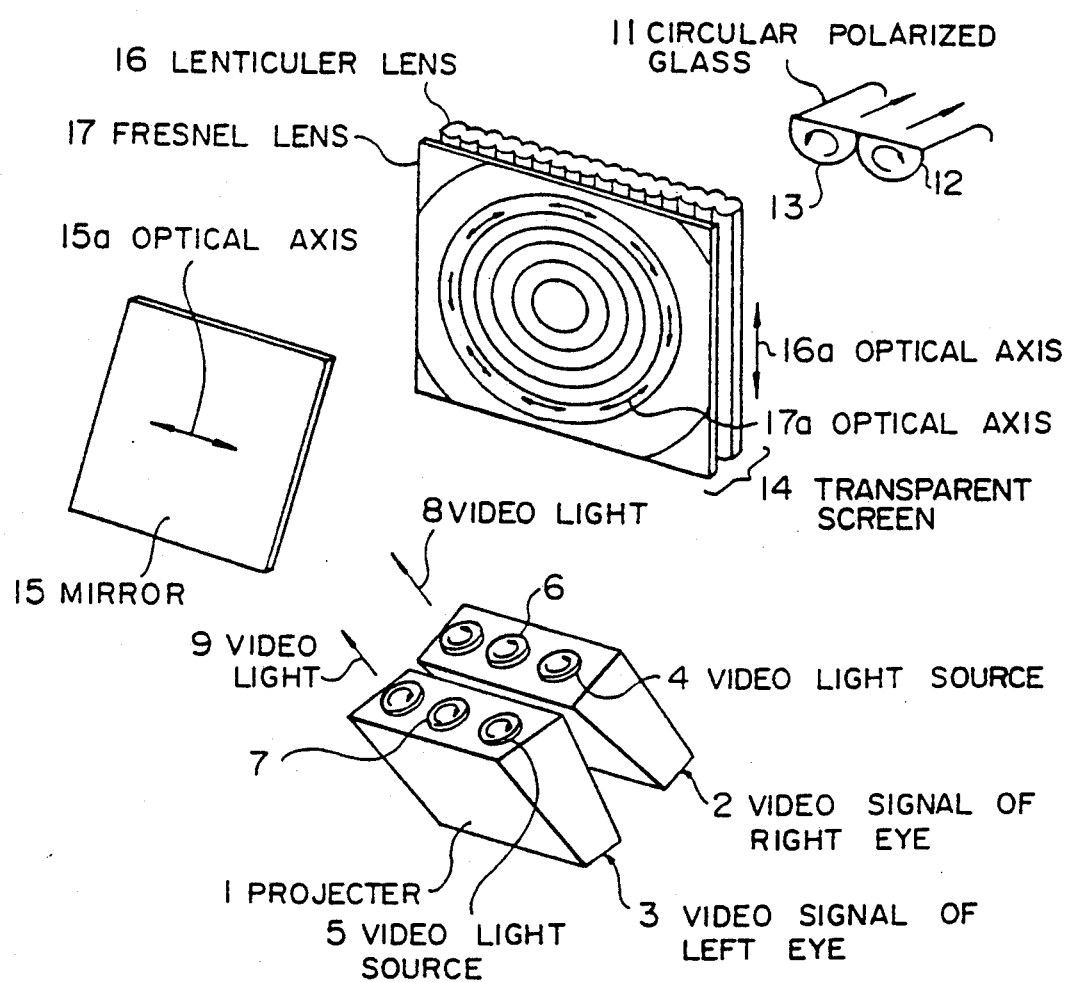
Figure 20:
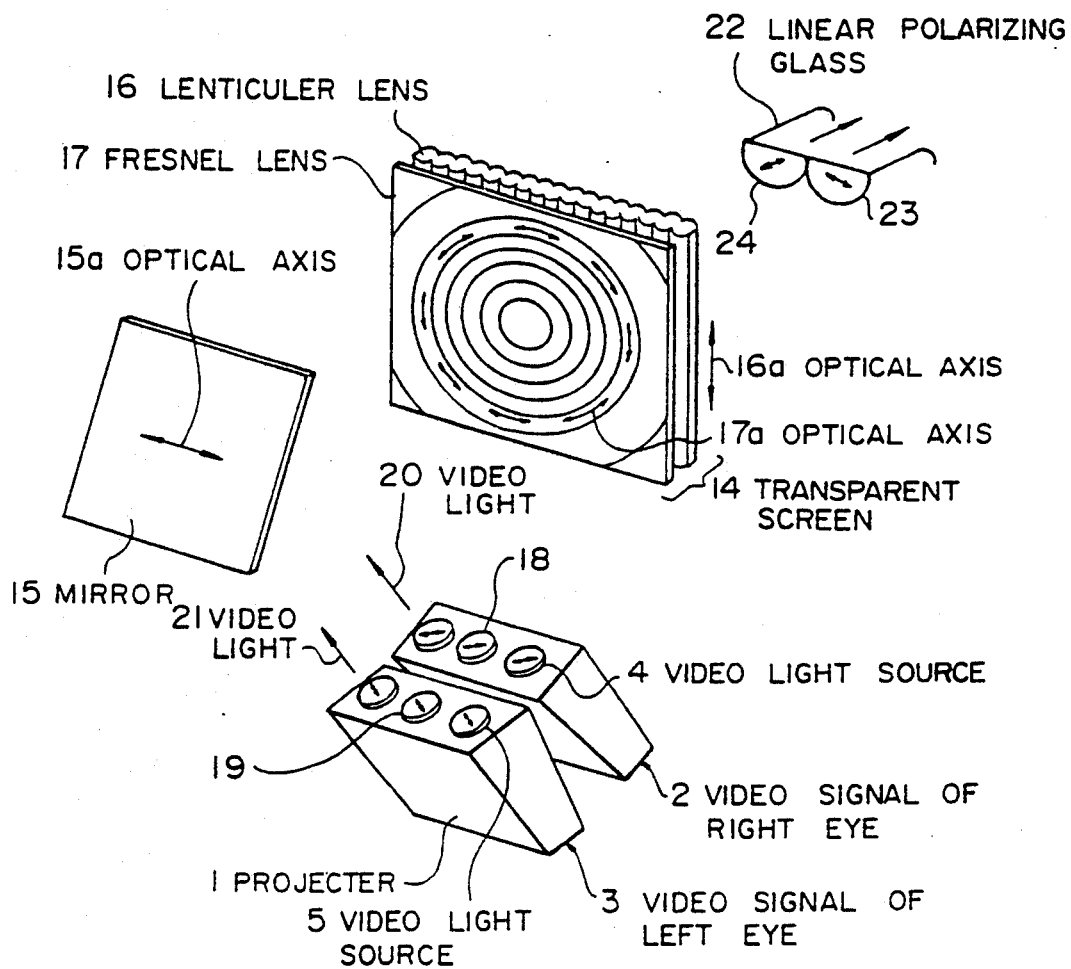
FIG. 20 is a perspective view showing an example of a conventional stereoscopic image display system.
Figure 21:
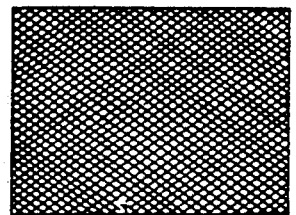
FIGS. 21, 22 and 23 are front views of the screens in FIGS. 18, 19 and 20 respectively.
Figure 22:
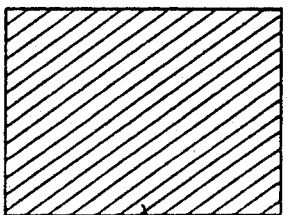
Figure 23:
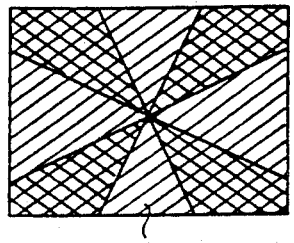

The present invention is not limited to the circular polarized glasses 42, 43 used in the embodiment shown in FIG. 16. For instance, circular polarized contact lenses may be used in place of the circular polarized glasses. The contact lenses may rotate within the eyes but pose no problem of a displaced angle of polarization because of the circular polarization. Further, as shown in FIG. 17, circular polarized plates 52, 53 made of circular polarizing filters may be used. In this case, the trouble of taking on glasses or contact lenses is eliminated.

In a binocular stereoscopic image display system according to the present invention, the viewer is able to view a stereoscopic image of good quality even if the optical elements (mirror, transparent screen and the like) interposed between a video light source and a combined image surface of containing a combined image surface have a phase difference of double refraction. Even a rear projection-type projector which has thus far had the problem of phase difference of double fraction is thus capable of displaying a stereoscopic image of superior quality according to the present invention.

Also, the polarized glasses used with the stereoscopic image display system according to the present invention have the polarizing filters thereof capable of being maintained at the optimum angle of polarization all the time, and therefore the viewer tilting his head or viewing the image from a direction displaced from the screen center of a combined image surface, is always able to enjoy a stereoscopic image of good quality.

Further, according to the present invention, a plurality of persons may view two different images independently at the same time by the use of a single image display system.

An embodiment of the screen according to the present invention will be explained below with reference to the accompanying drawings.

The optical system of a rear projection-type image display system includes a fresnel lens and a lenticular sheet as shown in Column 1-1 of FIG. 24. If these two elements are not homogeneous optically, a light phase difference is caused, resulting in a deteriorated contrast. Columns 1-2 and 1-3 show a case in which such a phase difference is compensated for by use of a phase compensator 6 or 7.

The fresnel lens and the lenticular sheet are made of a transparent plastics material and have a stress left in the plane and along the thickness thereof after the fabrication processes, which causes the light phase difference mentioned above. If the stress in the plane is divided into two components along two axes (optical axes) crossing each other at right angles, there develops an error between the refractive indexes n1 and n2 along the optical axes. This error, that is the double refraction (n1−n2) causes a light phase difference between the light components along the optical axes. In similar fashion, if the refractive index along the plate thickness is assumed to be n3, a similar phase difference is developed by the double refraction (n1−n3), (n2−n3) or the like based on the main stress difference in the section along thickness. The affixes 1 and 2 indicate the directions of the two optical axes respectively, and 3 the direction along the thickness.

Generally, when a light ray of wavelength λ passes through a medium having a thickness of T and a refractive index of m, the phase δ of the light with respect to the thickness T is given as $$\delta = 2\pi T/\lambda \quad (9)$$

On the other hand, there is a relationship shown below between the velocity c of light and the refractive index m.

$$c_1m_1 = c_2m_2$$

The affixes 1 and 2 indicate different media. From this equation, the ratio between the wavelengths λ 1 and λ 2 for the refractive indexes m1 and m2 is expressed as $$\lambda 1/\lambda 2 = m_2/m_1$$

Thus, the phase δ of the same light for the refractive index m2 is given as $$\delta = (2\pi T/\lambda\ 1)(m_2/m_1) \quad (10)$$

If the medium 1 is air, the term (m2/m1) corresponds to the specific refractive index of the medium 2 or the refractive index n2 according to the present invention.

In the case where a medium has an optical anisotropy and the above-mentioned refractive indexes along the perpendicularly-crossing optical axes take different values of n1 and n2, the light phases of the components along the optical axes of the light rays recording along the thickness are different and thus cause a light phase difference Δδ as given below.

$$\Delta\delta = (2\pi T/\lambda 1)(n_1 - n_2) \quad (11)$$

According to the present invention, the term (n1−n2) is expressed as a double refraction n12.

Further, in the case where a light ray proceeds diagonally in a medium with the refractive index changing along the thickness, the double refractions n13, n23, etc. due to the refractive index along the thickness cause a light phase difference Δδ as seen from below.

$$n_{13} = n_1 - n_3,\ n_{23} = n_2 - n_3$$

$$\Delta\delta = \frac{2\pi}{\lambda} \cdot \frac{T\sin^2\theta_1}{\cos\theta_1} \cdot \Delta n \quad (12)$$

where $\Delta n = (n_{13})^2 + (n_{23})^2$, and $\theta_1$ is a refractive index.

If a predetermined contrast is to be secured, it is necessary to maintain the sum of the two light phase differences within a predetermined limit. FIG. 25 shows the relationship of the limits of the light phase differences associated with the incident and outgoing light rays. In FIG. 25, Column 1 indicates a case in which the incident and outgoing light rays are both polarized clockwise/counterclockwise and the corresponding limit value of the phase difference of the optical system is given as $(N\pi + \Delta\delta)$ radians. $N\pi$ indicates that the phases of the two light components are relatively reversed or come to coincide with each other, and the contrast is associated with $\Delta\delta$. As described above, for example, the value of $\Delta\delta$ of the contrast of ten or more is $0.2\pi$ radians.

FIG. 25 shows a case of the linear polarization with the two incident and outgoing light rays crossing at right angles to each other. If the polarization axis of the incident light coincides with that of the optical system, the conditions for the light phase difference are identical to those in Column 1 of FIG. 25. Columns 1 and 2 will therefore be explained in a lump.

In FIG. 25, Columns 3 and 4 indicate a case in which clockwise/counterclockwise polarized rays are converted into perpendicularly-crossing linearly polarized rays or vice versa and are emitted. In this case, only $\pi/2$ radian is added to the light phase difference in Columns 1 and 2, and therefore these columns will also be explained in a lump.

First, reference is had to matters shared by the embodiments.

1) The incident angle of light to the lenticular sheet 4 is normally as small as 2 to 3 degree, and therefore the effect of the double fraction in the section along thickness thereof may be ignored. The incident angle of light to the fresnel lens, however, is as large as about 35 degree with a refractive angle as large as about 23 degree, and therefore the effect of the double refraction in the section along thickness is not negligible.

Thus, the double refraction in the section along thickness will be taken into account in the case of the fresnel lens but will be ignored for the lenticular lens.

2) The fresnel lens is fabricated by molding a fresnel prism 0.3 mm thick on a transparent base plate 3 mm thick by the ultraviolet ray-setting resin (UV resin). According to the present invention, an acrylate resin having an alicyclic skeleton very small in the coefficient of photoelecticity C is used as the UV resin. Since the molding stress due to the hardening and contraction of the UV resin is offset by the reaction of the base plate caused by the pressure, however, each double refraction of the fresnel prism takes a comparatively small value as shown below.

$n12f \approx 0$ $n13f = n23f = 20 \times 10^{-6}$

The affix f indicates a fresnel lens. As a result, taking into consideration that the thickness of the fresnel prism (0.3 mm or less) is sufficiently small as compared with the thickness (3 mm) of the base plate mentioned above, the double refraction of the fresnel prism may be ignored against that of the base plate. Specifically, the base plate is considered to control the double refraction of the whole fresnel lens.

Figure 26A:
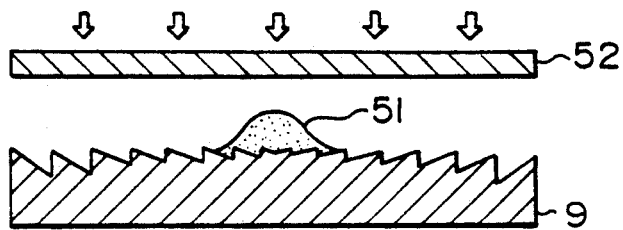
FIGS. 26(A) to (C) show processes of forming a fresnel lens.
Figure 26B:
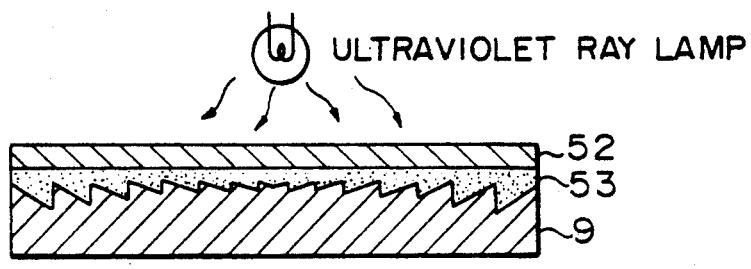
Figure 26C:
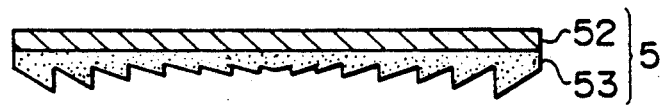

The above-mentioned fresnel lens is fabricated by the process shown in FIG. 26, that is the 2p molding process. First, as shown in FIG. 26(a), a UV resin 51 is disposed between a die 9 and a base plate 52, and as shown in (b) of the same diagram, is pressure-bonded under the influence of the ultraviolet ray, followed by the final step of a fresnel lens shown in FIG. 26(c).

3) The base plate of the fresnel lens and the lenticular sheet or the like are fabricated by the extrusion molding high in productivity and economy. Since the extrusion roll-molded plate is subjected to a force in a direction, an uneven internal stress easily develops, thereby increasing the light phase difference comparatively. The object of the present invention is to provide a rear projection-type stereoscopic image display system having a superior contrast even under unfavorable weathers.

4) Taking the strength and productivity as a screen into consideration, the thickness of the base plate of the fresnel lens 5 is set to 3 mm and that of the lenticular sheet to 1.4 mm.

5) The light phase difference is measured by use of the D ray (yellow, 589 nm) positioned at substantially the center of the visible light band (wavelength = 400 to 780 nm).

6) Four types of fresnel lenses F1 to F4 and two types of lenticular sheets including L1 and L2 shown in FIG. 27 are fabricated. Each fresnel lens group is constructed in a manner to include those lenses whose light phase difference is approximately $\pi/2$ and $\pi$ radians. This also applies to the lenticular sheet. A further embodiment of the present invention will be explained with reference to the fresnel lens and the lenticular sheet. In FIG. 27, those numerals having the mark * attached thereto indicate a phase difference component caused by the double refraction within the plane ($n12 = 21 - n2$), and numerals carrying the mark ** a phase difference component generated by the double refraction within the section along the thickness ($n13 = n1 - n3$, $n23 = n2 - n3$).

The base plate of fresnel lens F2 may be made of a single substance of polystyrene resin or polycarbonate resin.

EMBODIMENT 1

FIG. 28 shows an embodiment in which the fresnel lens and the lenticular sheet shown in FIG. 27 are appropriately combined in such a way that the total phase difference thereof is less than $0.2\pi$ radians corresponding to the contrast of 10.

Of all the combinations shown, F1-L1 to F3-L2 represent a case in which both the incident and outgoing light rays are circular or linear polarized as shown in FIG. 2.

The total phase difference of the combination F1-L1 or F4-L1 is $0.16\pi$ or $0.12\pi$ radians respectively and the contrast thereof 15 or 27 or more respectively. This indicates that a sufficient stereoscopic image is obtainable for practical purposes.

The total phase difference of the combination F2-L1 is $1.19\pi$ radians. Therefore, if $\pi$ radians is subtracted with N as 1, the value of $\Delta\delta$ becomes $0.19\pi$ radians with the contrast more than 10.

The total phase difference of the combination F3-L2 is $1.99\pi$ radians. If $2\pi$ radians is subtracted with N as 2, the value of $\Delta\delta$ becomes $0.01\pi$ radians, so that the contrast is ideally more than several hundreds.

In FIG. 28, the combinations F3-L1 to F2-L2 represent a case in which one of the incident and the outgoing light rays is circular polarized and the linear polarized as shown in FIG. 2.

The total phase difference of the combination F3-L1 is $0.63\pi$ radians. If $\pi/2$ radians is subtracted with N as 0, therefore, the value of $\Delta\delta$ becomes $0.13\pi$ radians with the contrast more than 22.

The total phase differences of the combinations F1-L2 and F4-L2 are $1.52\pi$ and $1.48\pi$ respectively. If $(\pi + \pi/2)$ radians is subtracted with N as 1, therefore, the value of Δδ is 0.02π radians for both combinations, thus producing a contrast more than several hundreds.

In the case of the combination F2-L2, on the other hand, the total phase difference is 2.55π, and therefore if 2.5π radians is subtracted with N as 2, the value Δδ of 0.05π radians and the contrast of more than 100 are obtained.

EMBODIMENT 2

This embodiment corresponds to 1-2 and 1-3 in FIG. 24, and is suitably applicable for compensating for the unrequired portions in the case where the total phase difference of the fresnel lens 5 and the lenticular sheet 4 exceeds 0.2π, for example. For this reason, as shown in 1-2 of FIG. 24, a phase compensator 6 is inserted between the fresnel lens 5 and the lenticular sheet 4 or, as shown in 1-3 of the same diagram, a phase compensator 7 is interposed between the fresnel lens 5 and a light source. Also, these phase compensators may be integrated with the screen as required.

In accordance with the relationship of polarization between the incident and outgoing light rays shown in FIG. 25, two types of screen including those in columns 1, 2 and 3, 4 are required. In such a case, if the screen for columns 1, 2 in FIG. 25 could be converted to the use for columns 3, 4 by adding the phase compensator 6 or 7 thereto, the stereoscopic image display systems for all relations of polarization could be fabricated with a single type of screen, thereby improving the system economy at a saving of the molding dies and processes while at the same time facilitating the design and stock control.

FIG. 29 is a diagram showing another embodiment of the present invention for converting the relations of polarization by use of the phase compensators. Since L2 is used for the lenticular sheet 4, the phase compensator 6 employs the same material with the same amount of phase compensation.

As a result, the use of the phase compensator 6 almost completely compensates for the light phase difference of the lenticular sheet 4, and therefore only the light phase difference of the fresnel lens remains with the contrast obtained in such a value as 100, 50, 22 or the like as shown in FIG. 29.

The phase compensator 7 is fabricated by three layers of ¼ wave sheet (film) of acetate resin very small in the change of light phase difference against the diagonal against the diagonal incident light. The light phase difference for each ¼ wave sheet is −0.5π radians, and therefore the total figure for the three layers is −1.5π radians. If this is combined with the fresnel lens and the lenticular sheet shown in FIG. 29, the value of Δδ due to F3-L2, F1-L2, F2-L2 or the like becomes 0.01 π, 0.01π and 0.05π radians or so on respectively, thus producing a superior contrast of more than 100 for every case.

According to the present embodiment of the invention, in order to prevent the transmittance loss due to the fresnel reflection of the lenticular sheet, the phase compensator and the fresnel lens, a laminated bonding may be used of a plurality of phase compensators, or between a phase compensator and a fresnel lens, or between a phase compensator and a lenticular sheet as desired.

Also, any number of phase compensators 6 or 7 may be used as required instead of one and three respectively as in the present embodiment of the invention.

EMBODIMENT 3

The above-mentioned embodiment of the invention uses a fresnel lens made by the 2p process. Actually, however, a more economical screen could be produced if the base plate and the fresnel prism could be molded integrally.

The thermoforming process, which may be cited as one of the methods of integral molding, has the disadvantage of a large residual stress. In order to obviate this disadvantage, according to the invention, acrylic resin of small coefficient of photoelasticity is employed to reduce the light phase difference which otherwise might be caused considerably by the residual stress.

For this purpose, a heat polymerized cast plate of acrylic resin is hot press formed to produce a fresnel lens 3 mm thick. The refractive index in the outer periphery is kept low for the integral molding as shown below.

$n12f \approx 5 \times 10^{-6}$, $n13f \approx 35 \times 10^{-6}$, $n23f \approx 30 \times 10^{-6}$ As the light phase difference of the fresnel lens 5, the figure of 0.05π radians was obtained for the in-plane double refraction, and 0.04π radians for double refraction in the section along the thickness for the total of 0.09π radians. By substituting these figures into F1, F2, etc. in FIG. 27, a superior contrast is obtained as in the foregoing embodiments.

EMBODIMENT 4

Figure 30:
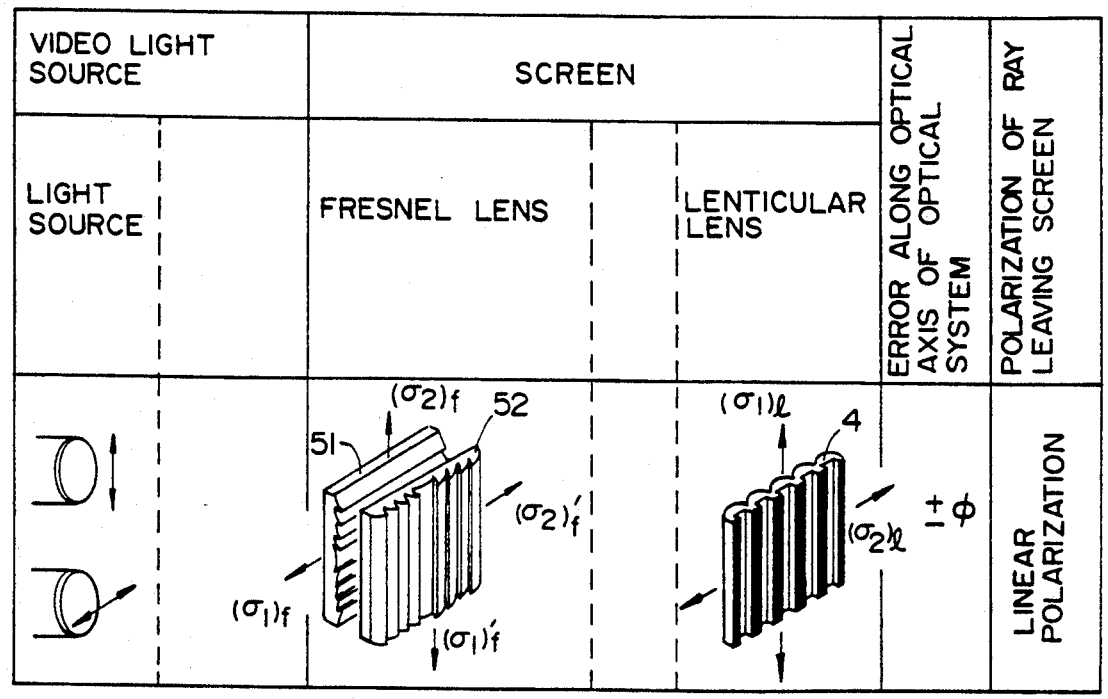
FIG. 30 is a diagram showing a configuration of an optical system according to a still further embodiment of the present invention.

FIG. 30 is a diagram showing another embodiment of the present invention corresponding to Column 2 of FIG. 25.

In FIG. 30, the plane of polarization of each of the vertical and horizontal polarized light rays leaving a light source is required to coincide with the directions of main stress of the lenticular sheet 4 and the fresnel lens 5. It is, therefore, necessary that the directions of main stress (optical axes) be uniform regardless of the magnitude of main stress.

In view of this, the fresnel lens is fabricated of two linear fresnel sheets 51 and 52 subjected to extrusion roll molding crossing at right angle to each other, thereby keeping the variations of the optical axes in less than 2 degree. In this case, a combined error of three sheets including the lenticular sheet occurs and is 6 degree in maximum for a contrast of 20 or more.

Such a linear fresnel sheet may be derived from such a material as acryl/styrene copolymer resin, acrylic resin, polystyrene resin, polycarbonate resin or other transparent resin.

EMBODIMENT 5

In each of the embodiments of the present invention, explanation has been made about a specific example of keeping the total light phase difference of the fresnel lens, the lenticular sheet and the phase compensator within a predetermined range.

In all the cases cited, however, the contrast may be further improved to some degree by adjusting the angle of the polarization axis of the optical system. Specifically, in the case where the incident light ray is linearly polarized, the angle of the polarization axis and the light phase difference of the optical system are adjusted, while in the case where the incident light is circular polarized, adjustment is made of the light phase difference. This adjustment is possible to some degree by changing the mounting angle of the phase compensator shown in Columns 1-2 and 1-3 of FIG. 24.

Figure 31:
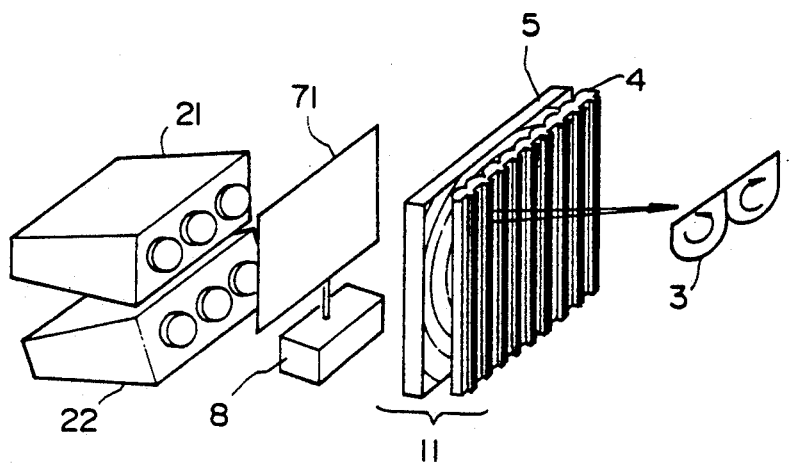
FIG. 31 is a diagram showing a mounting angle adjuster of the phase compensator according to the present invention.
Figure 32:
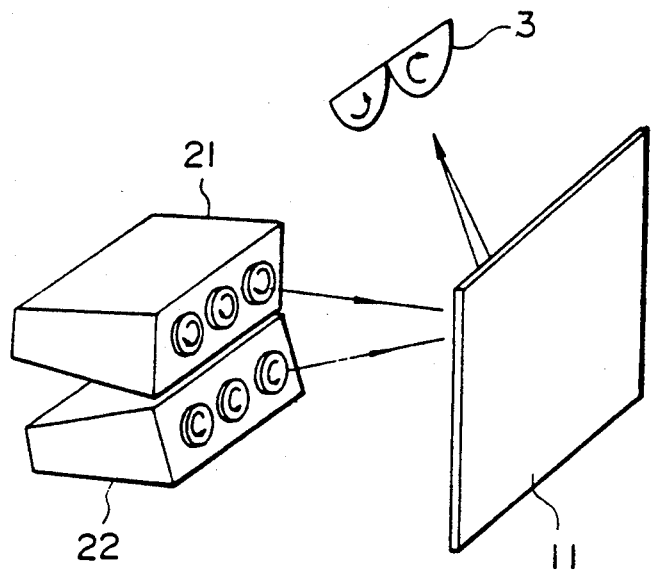
FIG. 32 shows a configuration of a full-surface reflection-type stereoscopic image display system according to the prior art.
Figure 33:
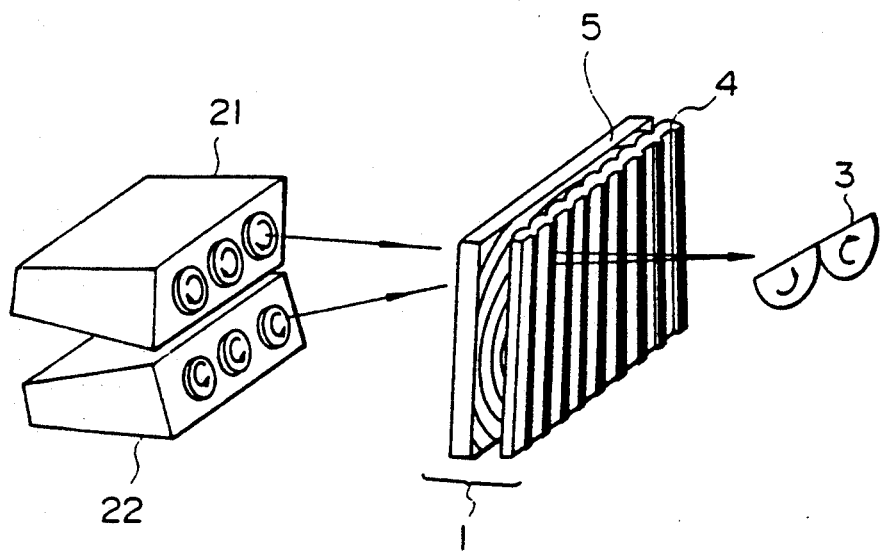
FIG. 33 is a diagram showing a configuration of a rear projection-type stereoscopic image display system according to the present invention.
Figure 35:
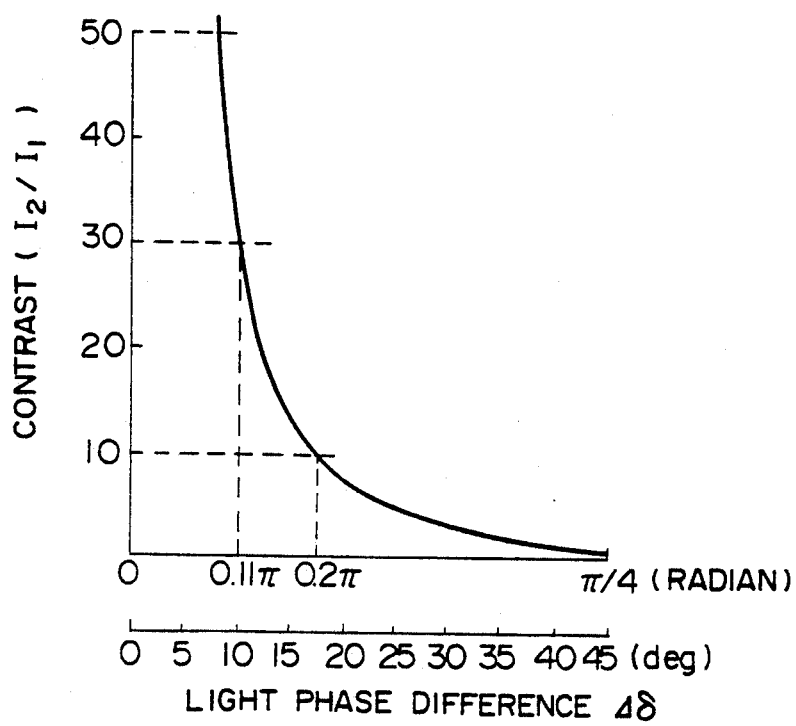
FIG. 35 is a diagram showing the relationship between the light phase difference and contrast according to the present invention.
Figure 36:
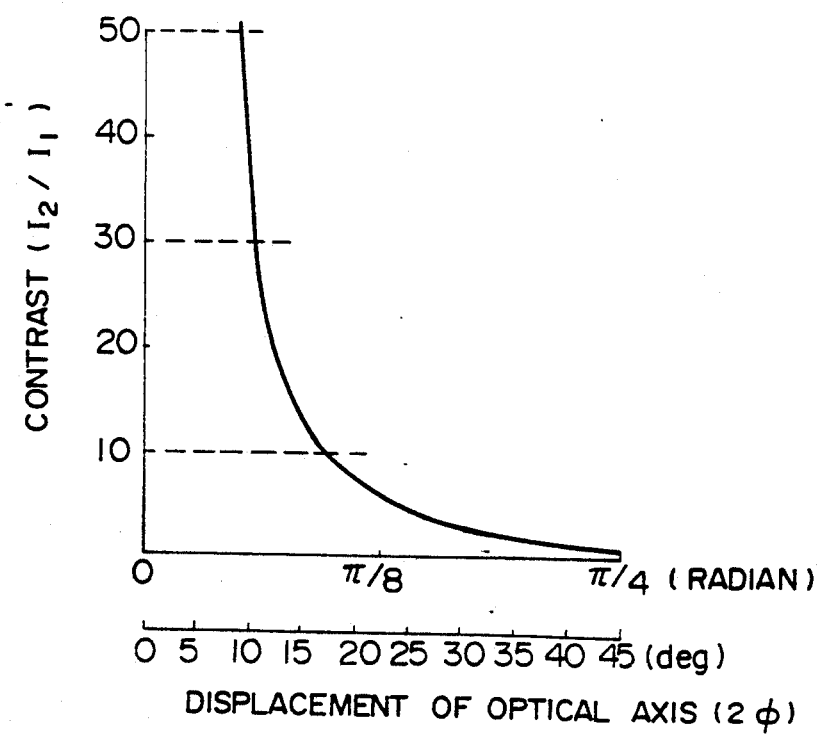
FIG. 36 is a diagram showing the relationship between the combined error of the optical axis and the polarization plane and contrast according to the present invention.

FIG. 31 is a diagram showing an embodiment of the present invention in which the mounting angle of each phase compensator 7 on the phase compensating frame 1 is adjusted by an adjuster 8. This adjustment is performed by controlling a screw or a screw drive unit by a remote control means or the like.

If the phase compensating frame 71 is placed in the neighbourhood of the light source, the area thereof may be comparatively reduced.

According to the present embodiment, the light phase difference of the screen of a rear projection-type stereoscopic image display system can be set to an appropriate value, thereby realizing a stereoscopic image display system having a high contrast and an improved sense of stereoscopy.

Further, a phase compensator may compensator for the light phase difference of the screen appropriately.

Furthermore, the fresnel lens, lenticular sheet and the phase compensator making up the screen may be fabricated by an extrusion roll-molded resin high in productivity and economy.

In addition, the contrast is further improved by adjusting the mounting angle of the phase compensator.

Another embodiment of the screen will be explained below.

In a rear projection-type projection television, a system as shown in Table 1 is conceivable as the one for viewing and enjoying a stereoscopic image by use of polarization. Specifically, as shown in Table 1, the light phase difference $\delta$ of an optical distortion and an optical axis are set in accordance with the polarization (circular or linear polarization) of the video light ray projected from a light source, whereby the polarization of the video light ray produced from the screen is circularly or linearly polarized. As a result, the television viewer is able to enjoy a stereoscopic image by wearing horizontal/vertically or clockwise/counterclockwise polarized glasses in accordance with the polarization.

double refraction. Depending on the size of the projection television, the incident light angle at the outermost periphery of the fresnel sheet 2 is as large as about 35 degree. If the refractive index n of the fresnel sheet material is assumed to be 1.5, therefore, the refractive angle in the fresnel sheet 2 is about 22.5 degree, so that the double refraction in the section along thickness has some effect to disturb the polarization of the video light rays, no matter how much the in-plane double refraction of the fresnel sheet is reduced. In order to prevent the polarization of the incident video light from being disturbed, therefore, the double refraction in the section along thickness is determined to produce an image superior in the sense of stereoscopy.

Specifically, the above-mentioned object of the present invention is achieved by a rear projection-type projection television system (1) including a fresnel sheet, in which assuming that t is the thickness of the fresnel sheet, $\lambda$ the wavelength of the light ray transmitted through the fresnel lens, $\theta_1$ the refractive angle of the same light after entrance into the fresnel sheet, and $\Delta n$ the average double refraction in the section along thickness of the fresnel sheet, the fresnel sheet satisfies the equation $$\Delta n \leq \left| \frac{0.1\lambda}{t} \cdot \frac{\cos\theta_1}{\sin^2\theta_1} \right|$$

or preferably (2) including a light phase difference compensator for offsetting the double refraction $\Delta n$ in the section along the thickness of the fresnel sheet, which compensator is disposed adjacently to the fresnel sheet, or more preferably (3) including two cylindrical fresnel lens sheets laid one on the other at right angles and a light phase difference compensator for offsetting the sum of the double refractions in the sections along the thickness of the fresnel sheets.

First, the determination of an optical distortion (double refraction, light phase difference) for producing a stereoscopic image will be explained.

If an image from an experimental data is to be viewed as a stereoscopic image, the ratio of intensity between the right and left video light rays entering the eyes is

TABLE 1

| | Video light polarization at light source | Light phase difference $\delta$ of optical system to screen (ideal value) | Polarization of light leaving screen | Polarized glasses |
|---|---|---|---|---|
| A | Circular polarization (Clockwise/counter- | $n\pi$ | Circular polarization | Circular polarized glasses |
| B | clockwise polarization) | $n\pi \pm \frac{\pi}{2}$ | Linear polarization | Linear polarized glasses |
| C | Linear polarization (Horizontal/vertical | $n\pi$ | Linear polarization | Linear polarized glasses |
| D | polarization) | $n \pm \frac{\pi}{2}$ | Circular polarization | Circular polarized glasses |
| E | | Phase difference free, optical axis coincident | Linear polarization | Linear polarized glasses | n = 0, ±1, ±2, ±3, ...

Figure 39:
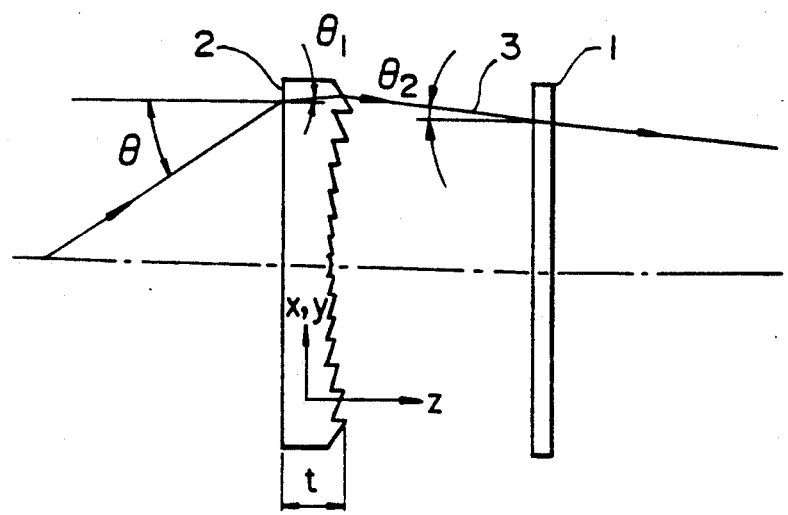
FIG. 39 is a sectional view of the optical system shown in FIG. 38.

Let us consider the case where n=0 for the systems A and C in Table 1, that is, the case where the optical distortion including the screen (double refraction, light phase difference) is lacking. With regard to the lenticular sheet 1 making up the screen, the incident angle $\theta_2$ of the light is a very small 2 to 3 degree in maximum as seen from FIG. 39 showing a sectional view of an optical system. This may be solved by reducing the in-plane required to be at least 1 to 10 (contrast of 10). Further, in order to produce a dignified and comfortable stereoscopic image, the contrast of at least 30 is desirable, or if an image is to be sensed as a complete stereoscopic image by the human eyes, a contrast of more than 50 is required.

In the circular polarization, if the light phase difference (tolerance) of an optical part is assumed to be λ, the intensity $(I_1)c$ of the emitting video ray is given by the equation below.

$$(I_1)c = a^2 \sin^2\left(\frac{\delta}{2}\right) \quad (1)$$

where a is the amplitude of the outgoing video light ray.

The intensity $(I_2)c$ of the outgoing image light ray in the opposite direction (phase error of π/2) to the circular polarized light ray is given by the equation below.

$$(I_2)c = a^2 \sin^2\left(\frac{\delta}{2} + \frac{\pi}{2}\right) \quad (2)$$

Thus the contrast $(I_2/I_1)c$ is expressed as $$\left(\frac{I_2}{I_1}\right)_c = \frac{a^2 \sin^2\left(\frac{\delta}{2} + \frac{\pi}{2}\right)}{a^2 \sin^2\left(\frac{\delta}{2}\right)} = \cos^2\left(\frac{\delta}{2}\right) \quad (3)$$

Figure 47:
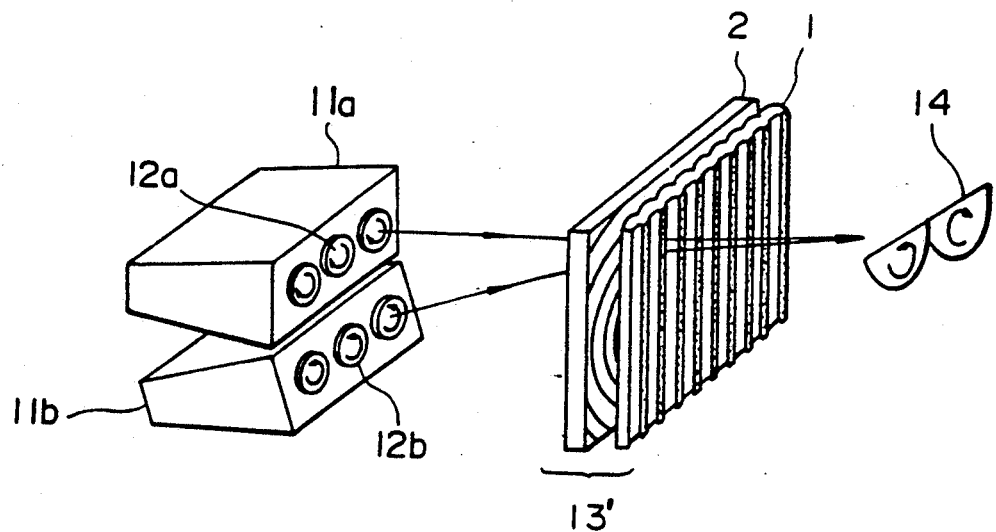
FIG. 47 is a perspective view showing an optical system for rear projection-type projection television according to the present invention.

This relationship is shown in FIG. 47. Specifically, the diagram indicates the relationship between the light phase difference error and the video contrast. From equation (3) and FIG. 47, it will be seen if the contrast of 10 or more is to be attained, the value δ is required to be 0.2π or less, and if the contrast of 30 or more is to be obtained, the value δ must be 0.11π or less, while the value δ of 0.09π or less is necessary for the contrast of 50 or more. As a result, in a stereoscopic projection television utilizing the circular polarization of light, a stereoscopic image is capable of being produced if the light phase difference error (tolerance) of the optical system is kept 0.2π or less.

In the linearly polarized condition, assume that the light phase difference error (tolerance) of an optical part is δ and the angle that the optical axis of the particular optical part forms with the linearly polarized light ray φ, then the intensity $(I_1)e$ of the outgoing light ray involved is given by the equation below.

$$(I_1)l = a^2 \sin^2(2\phi)\sin^2\left(\frac{\delta}{2}\right) \quad (4)$$

The intensity $(I_2)e$ of the projection video light ray crossing this linearly polarized light ray at right angles is expressed by $$(I_2)l = a^2\left\{1 - \sin^2(2\phi)\sin^2\left(\frac{\delta}{2}\right)\right\} \quad (5)$$

Thus the contrast under the linear polarization is given as $$\left(\frac{I_2}{I_1}\right)_l = \frac{a^2\left\{1 - \sin^2(a\phi)\sin^2\left(\frac{\delta}{2}\right)\right\}}{a^2\sin^2(2\phi)\sin^2\left(\frac{\delta}{2}\right)} \quad (6)$$

where in order to neglect the effect of φ, the effect of δ is studied assuming φ=π/4 associated with the maximum value of $\sin^2 2\phi$.

$$\left(\frac{I_2}{I_1}\right)_l = \frac{1 - \sin^2\left(\frac{\delta}{2}\right)}{\sin^2\left(\frac{\delta}{2}\right)} = \frac{\cos^2\left(\frac{\delta}{2}\right)}{\sin^2\left(\frac{\delta}{2}\right)} = \cos^2\left(\frac{\delta}{2}\right) \quad (7)$$

This equation is identical to equation (3). From this, it is understood that the value δ is requested to be set to 0.2π or less for the contrast of 10 or more, 0.11π or less for the contrast of 30 or more, and 0.09π or less for the contrast of 50 or more. Consequently, in a stereoscopic image projection television utilizing the linearly polarized light, a stereoscopic image may be produced if the light phase difference error (tolerance) of the optical system is kept at 0.2π or less.

The polarization displacement of a video light ray, that is, the displacement δ of the light phase difference caused by the double refraction in the section along thickness of the fresnel lens sheet will be explained with reference to FIG. 39.

As shown, let t be the thickness of the fresnel lens sheet 2, $\theta_1$ the refractive angle, and λ the wavelength of the light and assume that the in-plane double refraction is negligibly small as compared with the double refraction in the section along thickness. The light phase difference δf due to the average double refraction Δn along the thickness in the section of the fresnel lens sheet 2 is given as $$\delta_f = \left|\frac{2\pi}{\lambda} \cdot \frac{t\sin^2\theta_1}{\cos\theta_1} \Delta n\right| \quad (8)$$

As a result, the average double refraction Δn along the thickness in the section of the fresnel lens sheet is determinable from the light phase difference δ to be specified to produce a stereoscopic image as described above.

The requisite δ<0.2π for producing a stereoscopic image is substituted into equation (8).

$$\Delta n \leq \left|\frac{0.1\lambda}{t} \cdot \frac{\cos\theta_1}{\sin^2\theta_1}\right| \quad (9)$$

Also, the desirable condition for producing an image having a high sense of stereoscopy is δ<0.11π. Substituting this into equation (8), $$\lambda n \leq \left|\frac{0.05\lambda}{t} \cdot \frac{\cos\theta_1}{\sin^2\theta_1}\right| \quad (10)$$

Further, as a condition for producing an almost complete stereoscopic image, δ<0.09π is substituted into equation (8), and then $$\Delta n \leq \left| \frac{0.045\lambda}{t} \cdot \frac{\cos\theta_1}{\sin^2\theta_1} \right| \quad (11)$$

In this way, the use of a fresnel lens sheet having the value of $\Delta n$ indicated by equations (9) to (11) is a requisite for realizing a rear projection-type projection television capable of producing a dignified stereoscopic image. By the way, the average double refraction $\Delta n$ along the thickness in the section of the sheet is defined by $$\Delta n = \frac{1}{t} \int_0^t \Delta n(t)dt \quad (12)$$

where $\Delta n$ is a double refraction along the thickness at a given point in the section.

EMBODIMENTS

Other embodiments of the screen according to the present invention will be explained below with reference to FIGS. 38 to 45. These embodiments concern a 46" rear projection-type projection television as a typical case. The present invention, however is not limited by the size of the projection television. Also, in spite of the description of a system having n=0 for A and C in Table 1 as a typical case, the other cases may also of course be embodied with equal effect.

EMBODIMENT 1

Figure 38:
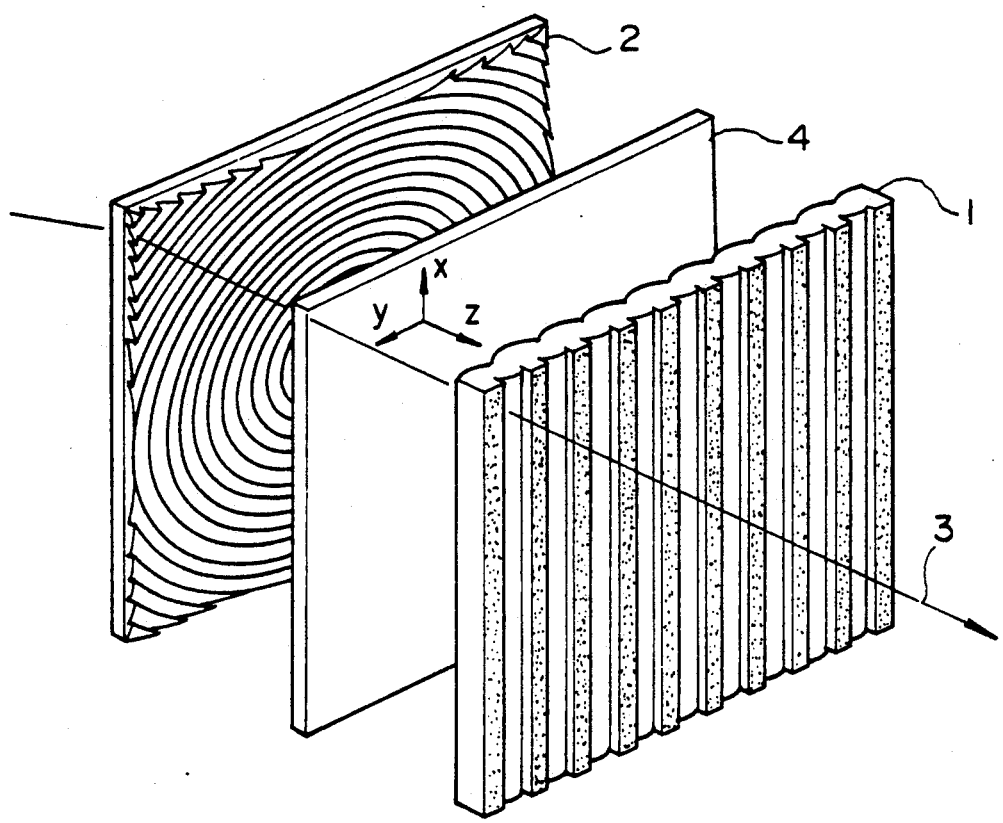
FIGS. 38, 43 and 44 are perspective views showing optical systems according to embodiments of the present invention.

FIG. 38 is a perspective view showing a screen configuration of a rear projection-type projection television according to the present invention. A lenticular lens sheet 1, for its special shape, is fabricated normally by the extrusion roll molding of acrylic resin. As a result, the in-plane double refraction $\Delta n_{xy} (=n_x-n_y)$ and the double refraction $\Delta n_{xz}(=n_x-n_z)$, $\Delta n_{yz}(=n_y-n_z)$ along the thickness in the section normally take the values of $300\times10^{-6}, 150\times10^{-6}$ and $15\times10^{-6}$ evidencing the extension in the x direction.

Figure 40:
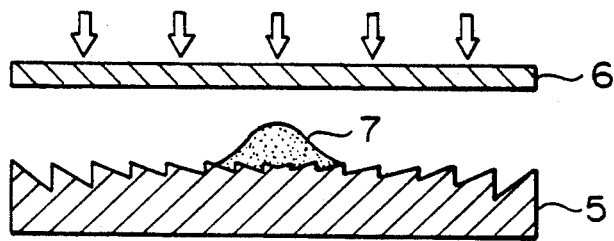
FIGS. 40, 41 and 42 are sectional views showing the process of fabricating a fresnel lens sheet according to an embodiment of the present invention.
Figure 41:
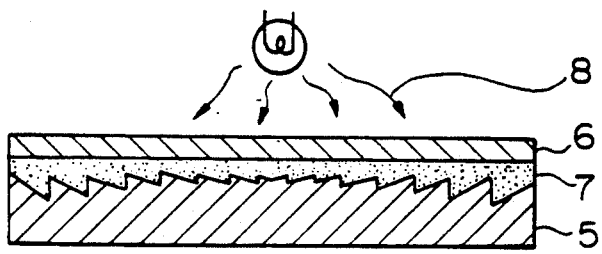
Figure 42:
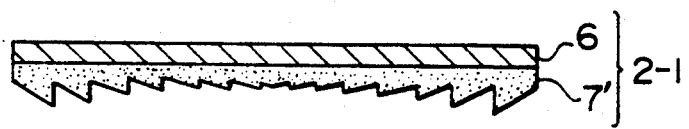

As explained above, the angle $\theta_2$ at which the video light ray 3 leaving the fresnel lens sheet 2 enters the lenticular lens sheet 1 is very small and about 2 to 3 degree as indicated in the sectional view of FIG. 40. As a result, the double refraction along thickness in the section studied in the present invention does not pose any substantial problem. The double refraction of the lenticular lens sheet 1 may be offset as an in-plane double refraction, or simply, a transparent sheet molded in the same manner with the same resin as the lenticular lens sheet 1 is installed as a phase difference compensator 4 at a position crossing the extension of the lenticular lens sheet at right angles thereto (along the roll direction).

In the case of the fresnel sheet 2, on the other hand, the incident angle $\theta$ of the video light ray is large along the periphery, and the double refraction in the section along thickness as well as the in-plane double refraction has an effect on the polarization of the video light ray. In FIG. 40, in the case of a 46" television system, the maximum incident angle $\theta$ at which the video light ray enters the fresnel lens sheet 2 is about 36.7 degree under normal design. If the refractive index n of the fresnel sheet material is 1.49, for instance, the refractive angle $\theta_1$ is 23.6 degree. In the case where the thickness t of the fresnel lens sheet 2 is 3.3 mm, and the light phase difference $\delta$ with the contrast of 10 satisfying the condition for producing a stereoscopic image is $0.2\pi$ with the value $\lambda$ of 589 nm and the in-plane double refraction negligibly small ($n_x \approx n_y$), the double fraction $\Delta n$ ($=\sqrt{\Delta n_{xy}^2+\Delta n_{yz}^2}$) along the thickness in the section of the fresnel lens sheet 2 is determined from equation (9), thereby producing $|\Delta n| \leq 112\times10^{-6}$.

As a result, what is called the 2p (photo polymerization) process is employed using an ultraviolet ray-setting resin capable of low-distortion molding in order to secure a fresnel sheet of $n_x \approx n_y$ and $|\Delta n| \leq 112\times10^{-6}$, with a heat copolymer cast plate of low-distortion acrylic resin for the base plate.

As to the double refraction of this base plate which is $n_x \approx n_y$, the in-plane double refraction is negligibly small ($n_{xy} \approx 0$) and the double refraction in the section $|\Delta n|$ as $45\times10^{-6}$.

The ultraviolet ray-setting resin used for the 2p process in order to reduce the double refraction also included as a main component the acrylate resin having an alicyclic skeleton small in photoelasticity coefficient C ($C=10\times10^{-12}$ m²/N).

By the use of the base plate and the ultraviolet ray-setting resin mentioned above, the fresnel sheet was molded by the 2p process. The principle and sequence of the molding process will be explained briefly with reference to the process diagrams of FIGS. 40 to 42. With an ultraviolet ray-setting resin 7 arranged between a fresnel lens sheet die 5 and a base plate 6, an ultraviolet ray 8 ($\lambda=360$ nm) is irradiated from the base plate 6 side. In the process, a molding residual stress (causing a double refraction) is generated by the hardening and contraction of the ulraviolet ray-setting resin 7. As a result, the in-plane contraction (in x and y directions) of the ultraviolet ray-setting resin 7 is absorbed by the contraction along the thickness (z direction). Specifically, the entire amount of volumetric contraction of the resin is required to be offset by the displacement along the thickness, and it is desirable to apply pressure on the base plate 6 during the setting of the resin. After the ultraviolet ray-setting resin 7 is set, the fresnel lens sheet die 5 is removed thereby to produce a fresnel lens sheet 2-1 shown in FIG. 42.

A checking of the double refraction of the fresnel lens sheet 2-1 produced in this manner shows that there is substantially no in-plane double refraction as in the case of the base plate 6 ($n_x \approx n_y$, that is, $n_{xy}=0$). The double refraction along the thickness in the section, on the other hand, was (1) $45\times10^{-6}$ for the bases plate 6 as before the molding process, and (2) a maximum of $50\times10^{-6}$ for the prism (maximum thickness of 0.3 mm) of the fresnel lens due to the ultraviolet ray-setting resin 7. The light phase difference $\delta_f$ due to the double refraction along the thickness in the section, as calculated from equation (8), is given below, $$\delta_f = \frac{2\pi}{589\times10^{-9}} \cdot \frac{\sin^2(23.6°)}{\cos^2(23.6°)}$$

$$\cdot \left( \frac{3\times10^{-3}\times45\times10^{-6} + 0.3\times10^{-3}\times50\times10^{-6}}{3.3} \right)$$

$$\approx 0.09\pi$$

where the wavelength $\lambda$ is assumed to be 589 nm.

This value of $\delta_f = 0.09\pi$ satisfies the light phase difference corresponding to the contrast of 50 mentioned above, and represents a fresnel lens sheet capable of producing a stereoscopic image of a very high quality.

EMBODIMENT 2

Embodiment 1 uses a cast and heat polymerized acryl sheet which increases in the crosslinked polymerization degree as a base plate 6 in the 2p molding process (with the molecular weight increased for a stable chemical characteristic) taking into consideration the mechanical properties and the reliability including the solvent resistance, etc. of the fresnel sheet 2.

In order to improve the productivity of the base plate 6 and the adherence thereof with the ultra-violet ray-setting resin 7 (bloating tendency of solvent), however, the present embodiment of the invention uses an extrusion-molded sheet of a copolymer of methylacrylate acrylate (MA) and ethylacrylate (EA). The extrusion molding generally develops a residual stress by the roll extension and usually causes a large double refraction in the plane and section. The fact that this acrylic resin has only a small photoelasticity coefficient ($C \approx -40 \times 10^{-12}$ m²/N) and the employment of a molding process avoiding an abrupt cooling and dampening the extension, however, are capable of keeping the double refraction very small.

The extrusion molded sheet (3 mm thick) of MA EA copolymer acrylic resin used in this embodiment has only a very small double refraction as seen from the in-plane double refraction of $n_{xy} \approx 0$, and the double refraction along thickness in the section of $n_{xz} = -10 \times 10^{-6}$, $n_{yz} = -5 \times 10^{-6}$, $|\Delta n| = 11 \times 10^{-6}$. With this acryl extrusion molded sheet used as a base plate for the 2-molding process, a fresnel lens 2-1 was fabricated by the 2p molding shown in Embodiment 1.

A study of the double refraction of the fresnel lens sheet 2-1 thus produced shows that there is substantially no in-plane double refraction found as in the base plate 6 ($n_{xy} = -0$). The double refraction $\Delta n$ in the section along thickness, on the other hand, was (1) $11 \times 10^{-6}$ for the base plate 6 as before the molding and (2) a maximum of $50 \times 10^{-6}$ for the prism (maximum thickness 0.3 mm) of the fresnel lens due to the ultra-violet ray-setting resin 7. The light phase difference $\delta_f$ due to the double refraction in the section along thickness as calculated in the same method as in Embodiment 1 gives $\delta_f \approx 0.03\pi$. This light phase difference $\delta_f = 0.03\pi$ is equivalent to about 100 as the contrast mentioned above. This fresnel lens sheet is thus capable of producing a very satisfactory stereoscopic image.

EMBODIMENT 3

This embodiment uses a polystyrene resin sheet as a base plate 6 for molding a fresnel lens sheet by the above-mentioned 2p process. This polystyrene cast sheet is molded to such an extent that substantially no double refraction is observed in the plane, but develops a stress and a double refraction due to the molding contraction attributable to the constraints or the like along the thickness. The photoelasticity coefficient of the polystyrene resin is about $-4000 \times 10^{-12}$ m²/N, and under the normal casting conditions, a double refraction of $\Delta n = 1280 \times 10^{-6}$ occurs when $n_{xz} = n_{xy} = -200 \times 10^{-6}$. The fresnel lens sheet 2-2 molded by the 2p process with an ultraviolet ray-setting resin (0.3 mm thick) used in Embodiment 1 by means of a base plate (3 mm thick) of such a polystyrene resin has a double refraction in the section along the thickness approximately $-280 \times 10^{-6}$ as in the base plate. This double refraction of $-280 \times 10^{-6}$ gives a light phase difference of $\delta = 0.5\pi$ along the outer periphery in the case of a 46" fresnel lens sheet, thus making it impossible to produce a stereoscopic image along the outer periphery.

Figure 43:
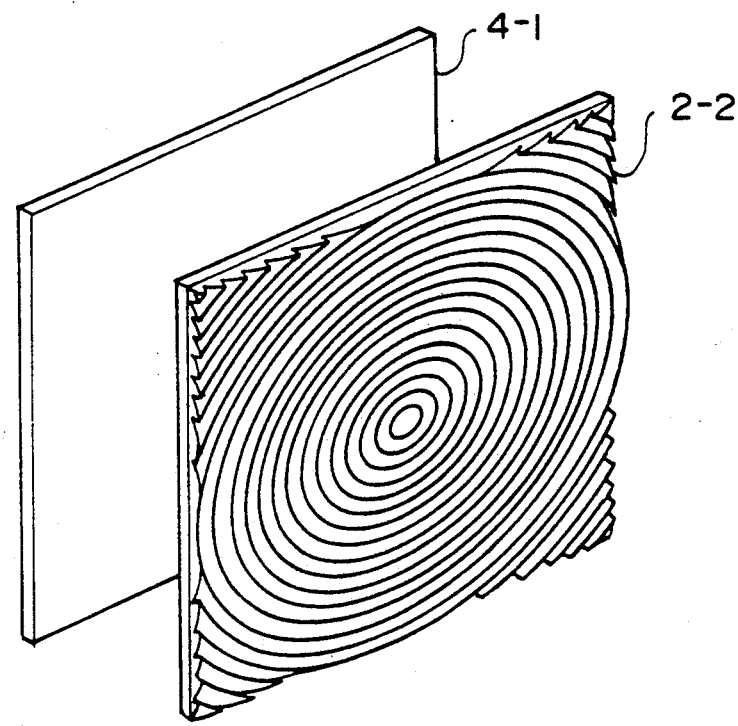
Figure 44:
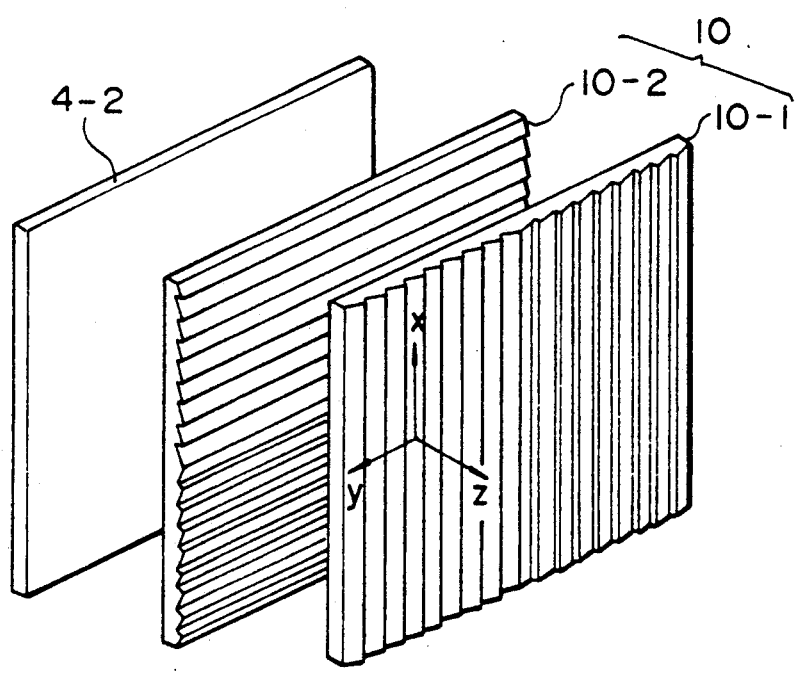
Figure 45:
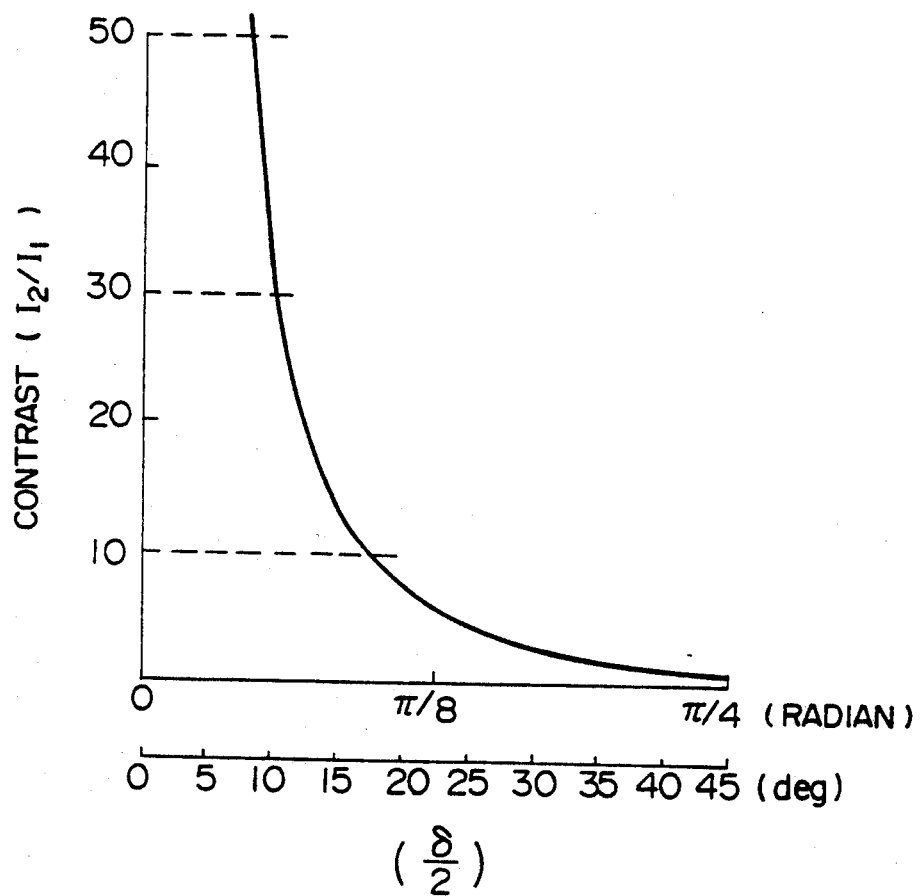
FIG. 45 is a diagram showing a characteristic curve of the relationship between the error of light phase difference and the image contrast.
Figure 46:
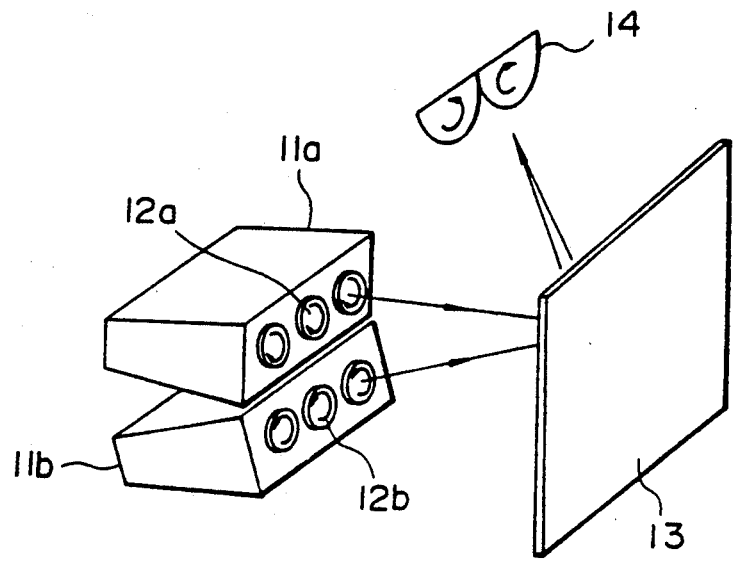
FIG. 46 is a perspective view of an optical system for front projection-type projection television according to the prior art.

In order to offset this double refraction in the section along thickness, a phase difference compensator 4-1 is disposed at a position indicated in the perspective view of FIG. 43 showing an optical system. This phase difference compensator 4-1 is made of polystyrene resin of the same material as the base plate 6 of the fresnel lens sheet mentioned above but with a photoelasticity coefficient C of the opposite sign, and may be formed by a molding process similar to that for the base plate. Accordingly, a polycarbonate resin was used which has a sign opposite to but substantially the same magnitude as polystyrene resin. The photoelasticity coefficient C of polycarbonate resin is $5300 \times 10^{-12}$ m²/N. The double refraction $n_{xz}$, $n_{yz}$ in the section along thickness of a flat sheet produced by the casting of polycarbonate resin was about $300 \times 10^{-6}$ with $\Delta n = 420 \times 10^{-6}$. As a result, in order to offset the double refraction of about $-280 \times 10^{-6}$ in the section along thickness of this fresnel sheet, the thickness (about 2 mm) of the cast sheet of polycarbonate resin was adjusted to produce a phase difference compensator 4-1.

Unlike in the aforementioned case in which the base plate 6 of the fresnel lens sheet 2-2 is made of polystyrene resin and the phase difference compensator 4-1 of polycarbonate, the former may be made of the latter material and vice versa. Also, the effect of offsetting the phase differences holds even if the fresnel lens sheet 2-2 is formed of acryl/styrene copolymer and the phase difference compensator 4-1 of polycarbonate resin.

Further, the phase difference compensator 4-1 may be installed immediately after being polarized by the video light emitting lens.

EMBODIMENT 4

The above-mentioned Embodiments 1 to 3 involved a circular fresnel lens with the fresnel lens sheet 2 providing a concentric diffraction grating. Now, a linear (cylindrical) fresnel lens will be referred to.

Linear fresnel lens sheets 10-1, 10-2 each 1.5 mm thick as shown in FIG. 7 are fabricated by the extrusion roll molding of acryl/styrene copolymer resin. The linear fresnel lens sheets 10-1, 10-2 thus fabricated develop, as the result of extrusion rolling, an in-plane double refraction $\Delta n_{xy}$ of approximately $-200 \times 10^{-6}$, a double refraction $\Delta n_{xz}$ of about $-150 \times 10^{-6}$ and $\Delta n_{yz}$ of about $-10 \times 10^{-6}$ along thickness in the section, resulting in the double refraction $\Delta n$ of about $-150 \times 10^{-6}$.

If two linear fresnel lens sheets 10-1, 10-2 are arranged at right angles to each other as shown in FIG. 7, the same functions as the circular fresnel lens would be developed with the in-plane double fraction $\Delta n_{xy}$ offset, thus forming a circular lens free of in-plane double refraction. Nevertheless, there exist double refractions $n_{xz}$, $n_{yz}$ of $-160 \times 10^{-6}$ along thickness in the section.

As a result, there needs a phase difference compensator 4-2 to offset this double refraction along thickness in the section. A polycarbonate resin cast sheet similar to the one for Embodiment 3 is used as the phase difference compensator 4-2. In order to offset the double refractions along thickness in the section of the two linear fresnel lens sheets, the phase difference compensator is adjusted to the thickness of 1.2 mm by a simple calculation.

As described in Embodiment 3, the linear fresnel lens sheet may be formed of polycarbonate resin, and the phase difference compensator 4-2 of a polystyrene resin product. Also, the phase difference compensator 4-2 may be installed immediately after being polarized by the video light emitting lens.

In Embodiment 1, the light phase difference $\delta_f$ of $0.09\pi$ is attained. Also, Embodiments 2 and 3 satisfy the phase difference of $\delta_f \leq 0.09\pi$ by adjusting the thickness of the phase difference compensator. In order to reduce the manufacturing cost, however, it is easy to set $\delta$ to $0.1\pi$ corresponding to the contrast of 30 or to $0.2\pi$ corresponding to the contrast of 10 by relaxing the control of he double refraction of the base plate and the phase difference of the phase difference compensator.

Furthermore, the light phase difference requirement of $\delta_f \leq 0.2\pi$ is sufficiently met if an ultraviolet ray-setting resin (photoelasticity coefficient $C=10\times10^{-12}$ m$^2$/N) with acrylate resin having a benzene ring skeleton in order to increase the refractive index of the ultraviolet ray-setting resin 7 forming the fresnel lens (prism) in Embodiments 1 to 3.

It will thus be understood from the foregoing description that according to the present invention the polarization error of a polarized video light ray generated by the double refraction in the section along thickness of a fresnel lens sheet making up a screen used for a rear projection-type projection television could be reduced below $0.2\pi$ as a phase difference. It is therefore possible to project right/left polarized light rays or horizontal/-vertical polarized light rays on the screen (the surface of a lenticular lens sheet on viewer side), and thus the television viewer is able to view an image having a superior sense of stereoscopy over the whole area of the screen.

We claim:

1. A projection-type stereoscopic image display system comprising a first signal circuit for transmitting a left-eye video signal for producing a left-eye image, a second signal circuit for transmitting a right-eye video signal for producing a right-eye image, left-eye image display means supplied with the transmitted left-eye video signal for producing a left-eye projection ray, right-eye image display means supplied with the transmitted right-eye video signal for producing a right-eye projection ray, a transparent screen, a left-eye projection optical system for projecting the produced left-eye projection ray in an enlarged form on the transparent screen from behind, a right-eye projection optical system for projecting the produced right-eye projection ray in an enlarged form on the transparent screen from behind, a left-eye polarizing filter arranged on the front of the left-eye projection optical system for polarizing the left-eye projection ray, and a right-eye polarizing filter arranged on the front of the right-eye projection optical system for polarizing the right-eye projection ray, wherein the left-eye image is displayed by the left-eye projection ray and the right-eye image by the right-eye projection ray projected on the transparent screen thereby to reproduce a stereoscopic image.

2. A projection-type stereoscopic image display system according to claim 1, wherein each of the left-eye image display means and the right-eye image display means includes selected one of a projection CRT and a liquid crystal display panel.

3. A projection-type stereoscopic image display system according to claim 1, wherein said plastics screen is formed of an ultraviolet ray-setting resin.

4. A rear projection-type stereoscopic image display system according to claim 1, wherein the fresnel prism of selected one of the fresnel sheet and the fresnel lens is made of an ultraviolet ray-setting resin.

5. A projection-type stereoscopic image display system according to claim 1, wherein said transparent screen is made of a plastics screen.

6. A projection-type stereoscopic image display system according to claim 3, wherein said plastics screen is annealed after being formed.

7. A projection-type stereoscopic image display system according to claim 5, wherein the plastics screen is formed of a resin sheet in such a manner that the retardance $\delta$ of the plastics screen is not more than $\lambda/(10\pi)$, the retardance $\delta$ being the product of the thickness d of the plastics screen and the double refraction $\Delta n$ thereof, which in turn is the difference between the refractive index $n_1$ of a linearly polarized normal ray along the axial direction and the refractive index $n_2$ of a linearly polarized abnormal ray along the axial direction, said linearly polarized ray entering the plastics screen.

8. A projection-type stereoscopic image display system according to claim 7, wherein said plastics screen is made of polymethyl methacrylate resin.

9. A rear projection-type stereoscopic image display system according to claim 5, wherein the screen includes a fresnel lens and a lenticular sheet.

10. A rear projection-type stereoscopic image display system according to claim 9, wherein the fresnel lens and the lenticular lens are fabricated by the extrusion roll molding of selected one of arylic resin and acryl/styrene copolymer resin.

11. A rear projection-type stereoscopic image display system according to claim 9, wherein the lens include two linear fresnel sheets crossing at right angles to each other.

12. A projection-type stereoscopic image display system according to claim 5, wherein a phase compensator of a transparent plastics film is arranged in the light paths of the left-eye projection ray and the right-eye projection ray leading from the left-eye polarizing filter and the right-eye polarizing filter to the transparent screen.

13. A projection-type stereoscopic image display system according to claim 12, wherein said phase compensator is an optical double refractive member for separating the incident linearly polarized light into two linearly polarized light rays with the directions of oscillation thereof crossing at right angles to each other, and the relative phase difference between the outgoing two linearly polarized light rays increases steadily with the distance from a reference point along the surface of the phase compensator arranged in such a manner that the optical axis of the projection light transmitted through the center of the transparent screen is passed through the reference point.

14. A method of fabricating a phase compensator of a projection-type stereoscopic image display system according to claim 13, comprising the step of applying a stress distortion increasing steadily from the center of the transparent plastics film toward the periphery thereof.

15. A method of fabricating a projection-type stereoscopic image display system according to claim 14, in which the transparent plastics film of the phase compensator is made of cellulose oxide.

16. A projection-type stereoscopic image display system comprising:

a first signal circuit for transmitting a left-eye video signal for producing a left-eye image;

a second signal circuit for transmitting a right-eye video signal for producing a right-eye image;

a plurality of three-primary-color projection CRTs for the left eye including at least a red projection CRT, a green projection CRT and a blue projection CRT supplied with the left-eye image signal for producing red, green and blue projection light rays respectively;

a plurality of three-primary-color projection CRTs for the right eye including at least a red projection CRT, a green projection CRT and a blue projection CRT supplied with the right-eye image signal for producing red, green and blue projection light rays respectively;

a plurality of left-eye projection optical systems including at least a red projection optical system, a green projection optical system and a blue projection optical system for projecting in an enlarged form the red, green and blue projection light rays from the left-eye three-primary-color projection CRTs on the screen;

a plurality of right-eye projection optical systems including at least a red projection optical system, a green projection optical system and a blue projection optical system for projecting in an enlarged form the red, green and blue projection light rays from the right-eye three-primary-color projection CRTs on the screen;

a plurality of left-eye polarizing filters arranged on the front of the left-eye projection optical systems for polarizing the red, green and blue projection light rays respectively from the left-eye projection optical systems;

a plurality of right-eye polarizing filters arranged on the front of the right-eye projection optical systems for polarizing the red, green and blue projection light rays respectively from the left-eye projection optical systems; and, means for displaying a left-eye image by the red, green and blue projection light rays projected by the left-eye projection optical systems on the screen and a right-eye image by the red, green and blue projection light rays projected by the right-eye projection optical system on the screen thereby to reproduce a stereoscopic image;

wherein in reproducing a non-stereoscopic image, the same video signal is transmitted to the first and second signal circuits in place of the left-eye and right-eye video signals respectively, while at the same time removing the left-eye polarizing filter from the front of the left-eye projection optical system and the right-eye polarizing filter from the front of the right-eye projection optical system.

17. A projection-type stereoscopic image display system according to claim 16, wherein the reproductions of stereoscopic and non-stereoscopic images are switched by selected one of switch means and means for detecting and decoding a specific signal superimposed on the video signals.

18. A projection-type stereoscopic image display system according to claim 16, wherein said polarizing filters include at least a red polarizing filter, a green polarizing filter and a blue polarizing filter, each of said red, green and blue polarizing filters having selected one of a linear polarized plate and a circular polarized plate and arranged with the azimuths of the plane of polarization thereof not coincident with each other.

19. A projection-type stereoscopic image display system comprising:

a plurality of three-primary-color projection CRTs including at least a red projection CRT, a green projection CRT and a blue projection CRT supplied with a stereoscopic image video signal for producing a left-eye image and a right-eye image in time division;

a screen;

a plurality of projection optical systems including at least a red projection optical system, a green projection optical system and a blue projection optical system for projection in an enlarged form the red, green and blue projection light rays emitted from the three-primary-color projection CRTs;

a plurality of polarizing filters arranged on the front of the projection optical systems for polarization the red, green and blue projection light rays respectively;

a plurality of polarization axis converters including at least a red polarization axis converter, a green polarization axis converter and a blue polarization axis converter for converting the azimuth of the plane of polarization of each of the red, green and blue projection light rays polarized by the polarizing filters respectively, in synchronism with a control signal supplied thereto; and means for displaying a left-eye image and a right-eye image in time division by the red, green and blue projection light rays projected by the projection optical systems on the screen thereby to reproduce a stereoscopic image;

wherein in reproducing a non-stereoscopic image, the three-primary-color projection CRTs are supplied with a non-stereoscopic image video signal in place of a stereoscopic image video signal while at the same time removing the polarizing filters and the polarization axis converters from the fronts of the projection optical systems respectively.

20. A projection-type stereoscopic image display system according to claim 19, wherein the reproductions of stereoscopic and non-stereoscopic images are switched by selected one of switch means and means for detecting and decoding a specific signal superimposed on the video signals.

21. A projection-type stereoscopic image display system according to claim 19, wherein said polarizing filters include at least a red polarization filter, a green polarization filter and a blue polarization filter, each of said red, green and blue polarization filters having selected one of a linear polarized plate and a circular polarized plate and arranged with the azimuth of each plane of polarization thereof not coincident with each other.

22. A stereoscopic image display system comprising two video light sources for projecting two video light rays capable of being viewed in superimposed relations onto an image combination surface, means enabling the viewer to view a stereoscopic image with two video light rays combined with each other through a pair of polarized glasses having different polarization directions perpendicular with each other, wherein the video light sources produce two video light rays linearly polarized in the directions of polarization 90 degrees apart from each other, and optical elements disposed at a selected one of a position between the video light source and the video combination surface and a position containing the video combination surface, which optical elements have a phase difference of a double refraction and the same direction of the optical axes have the optical axes thereof arranged in a direction of a selected one of parallel and perpendicular to the direction of polarization of the video light source.

23. A stereoscopic image display system according to claim 22, wherein the optical elements having the same direction of optical axes are mirrors arranged diagonally in a direction of a selected one of parallel and perpendicular to the direction of polarization of the video light sources.

24. A stereoscopic image display system according to claim 22, wherein the polarized glasses are circular polarized with different left and right directions of circuit polarization, and a ¼ wave plate having an optical axis of double refraction at 95 degree from the direction of polarization of the video light source is interposed between the image combination surface and the polarized glasses.

25. A stereoscopic image display system according to claim 22, wherein the optical elements having the same direction of optical axes are a transparent screen with a continuous arrangement of processed surfaces in the form of a selected one of a lens and a prism extending in a direction of a selected one of parallel and perpendicular to the direction of polarization of the video light sources.

26. A stereoscopic image display system according to claim 25, wherein the transparent screen includes a selected one a lenticular lens or two lenticular lenses arranged in the directions 90 degree apart from each other.

27. A stereoscopic image display system according to claim 25, wherein the transparent screen includes selected one of a linear fresnel lens and two linear fresnel lenses arranged in the directions 90 degree apart from each other.

28. A stereoscopic image display system according to claim 22, wherein those optical elements having a phase difference of double refraction which have different directions of optical axes have a phase difference smaller than those optical elements having the same direction of optical axes.

29. A stereoscopic image display system according to claim 28, wherein those optical elements having a phase difference of double refraction include a transparent screen having a fresnel lens and a lenticular lens, the fresnel lens having a phase difference smaller than the lenticular lens.

30. A stereoscopic image display system according to claim 29, wherein the fresnel lens is fabricated by the molding of an ultraviolet ray-setting resin.

31. A stereoscopic image display system according to claim 29, wherein the fresnel lens is fabricated directed by the cutting process.

32. A rear projection-type stereoscopic image display system comprising selected one of means for projecting video light rays polarized clockwise and counterclockwise from behind a screen thereby to produce video light rays polarized clockwise and counterclockwise respectively and means for projecting two linearly-polarized video light rays having planes of polarization crossing at right angles to each other from behind the screen thereby to produce two linearly polarized video light rays with the planes of polarization crossing at right angles to each other, wherein the light phase difference $\delta$ due to the double refraction of an optical system including the screen and interposed between the projection light ray and the outgoing surface of the screen is set to a value within the range of radians expressed by $$(N-0.2)\pi \leq \delta \leq (N+0.2)\pi$$

where N is assumed to be an integral number including zero.

33. A rear projection-type stereoscopic image display system comprising selected one of means for projecting video light rays polarized clockwise and counterclockwise from behind a screen thereby to produce two linearly polarized video light rays with the planes of polarization thereof crossing at right angles to each other and means for projecting two linearly polarized video light rays with the planes of polarization thereof crossing at right angles to each other from behind the screen thereby to produce video light rays polarized clockwise and counterclockwise respectively, wherein the light phase difference $\delta$ due to the double refraction of an optical system including the screen interposed between the projection light rays and the outgoing surface of the screen is set to a value within the radian value of $(N\pm\frac{1}{2}-0.2)\pi \leq \delta \leq (N\pm\frac{1}{2}+0.2)\pi$ where N is assumed to be an integral number including zero.

34. A rear projection-type stereoscopic image display system comprising selected one of means for projecting video light rays polarized clockwise and counterclockwise thereby to produce video light rays polarized clockwise and counterclockwise respectively and means for projecting from behind the screen two linearly polarized video light rays with the planes of polarization crossing at right angles to each other thereby to produce two linearly polarized video light rays with the planes of polarization thereof crossing at right angles to each other, wherein a ½ wavelength polarizing plate is interposed between the projection light rays and the screen.

35. A rear projection-type stereoscopic image display system according to claim 34, further comprising means for adjusting the mounting angle of the ½ wavelength polarizing plate.

36. A rear projection-type stereoscopic image projection television comprising a fresnel lens satisfying the relationship $$\Delta n \leq \left| \frac{0.1\lambda}{t} \cdot \frac{\cos\theta_1}{\sin^2\theta_1} \right|$$

where t is the thickness of the fresnel lens sheet, $\lambda$ the wavelength of the light transmitted through the fresnel lens sheet, $\theta_1$ the refractive angle of the light ray entering the fresnel lens sheet, and $\Delta n$ the average double refraction in the section along thickness of the fresnel lens sheet.

37. A rear projection-type stereoscopic image projection television according to claim 36, further comprising a light phase difference compensator mounted adjacently to a fresnel lens sheet for offsetting the double refraction $\Delta n$ in the section along thickness of the fresnel lens sheet.

38. A rear projection-type stereoscopic image display system according to claim 36, comprising two cylindrical fresnel lens sheets superimposed at right angles to each other, and a light phase difference compensator adjacent to said lens sheet for offsetting the sum of the double refractions in the section along thickness of the two cylindrical fresnel lens sheets.

* * * * *